US012490021B2

(12) United States Patent
Wu et al.

(10) Patent No.: US 12,490,021 B2
(45) Date of Patent: Dec. 2, 2025

(54) TERMINAL APPARATUS

(71) Applicant: Honor Device Co., Ltd., Shenzhen (CN)

(72) Inventors: Jiang Wu, Shenzhen (CN); Bowen Chen, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/039,440

(22) PCT Filed: Dec. 16, 2022

(86) PCT No.: PCT/CN2022/139703
§ 371 (c)(1),
(2) Date: May 30, 2023

(87) PCT Pub. No.: WO2023/197653
PCT Pub. Date: Oct. 19, 2023

(65) Prior Publication Data

US 2024/0365053 A1 Oct. 31, 2024

(30) Foreign Application Priority Data

Apr. 14, 2022 (CN) ......................... 202210390774.4

(51) Int. Cl.
*H04R 1/34* (2006.01)
*H04R 1/02* (2006.01)

(52) U.S. Cl.
CPC ............. *H04R 1/345* (2013.01); *H04R 1/028* (2013.01); *H04R 2400/11* (2013.01); *H04R 2499/11* (2013.01); *H04R 2499/15* (2013.01)

(58) Field of Classification Search
CPC .... H04R 1/345; H04R 1/028; H04R 2400/11; H04R 2499/11; H04R 2499/15
See application file for complete search history.

(56) References Cited

U.S. PATENT DOCUMENTS

2021/0006876 A1 1/2021 Moon et al.
2021/0006880 A1* 1/2021 Yan ........................ H04R 1/028
(Continued)

FOREIGN PATENT DOCUMENTS

CN 110267157 A 9/2019
CN 111405098 A 7/2020
(Continued)

OTHER PUBLICATIONS

Machine translation of CN112291391A (Year: 2021).*

*Primary Examiner* — Andrew Sniezek
(74) *Attorney, Agent, or Firm* — Slater Matsil, LLP

(57) ABSTRACT

A terminal apparatus includes a first structural component, a second structural component, a third structural component, and at least one acoustic element, where the second structural component is located between the first structural component and the third structural component, and the first structural component, the second structural component, and the third structural component surround and form a cavity; the acoustic element is accommodated in the cavity; at least one sound emission slot is formed between the first structural component and the second structural component and/or between the second structural component and the third structural component, a sound guide slot is in communication with the sound emission slot, the sound emission slot is located on a side of the sound guide slot that faces away from the acoustic element, and the acoustic element transmits sound to the outside through the sound guide slot and the sound emission slot.

20 Claims, 14 Drawing Sheets

(56) References Cited

U.S. PATENT DOCUMENTS

| | | | |
|---|---|---|---|
| 2023/0007109 | A1 | 1/2023 | Liang et al. |
| 2023/0261684 | A1 | 8/2023 | Wu et al. |

FOREIGN PATENT DOCUMENTS

| | | | |
|---|---|---|---|
| CN | 111405413 | A | 7/2020 |
| CN | 211830849 | U | 10/2020 |
| CN | 112291391 | A | 1/2021 |
| CN | 112911037 | A | 6/2021 |
| CN | 113037894 | A | 6/2021 |
| CN | 214507136 | U | 10/2021 |
| CN | 113873070 | A | 12/2021 |
| CN | 114520845 | A | 5/2022 |
| WO | 2020097784 | A1 | 5/2020 |
| WO | 2021051835 | A1 | 3/2021 |

* cited by examiner

TERMINAL APPARATUS

CROSS-REFERENCE TO RELATED APPLICATIONS

This application is a national stage of International Application No. PCT/CN2022/139703, filed on Dec. 16, 2022, which claims priority to Chinese Patent Application No. 202210390774.4, filed on Apr. 14, 2022. The disclosures of both of the aforementioned applications are hereby incorporated by reference in their entireties.

TECHNICAL FIELD

This application relates to the field of an electronic product with an audio function, and in particular, to a terminal apparatus.

BACKGROUND

A terminal apparatus 100' (such as a mobile phone, refer to FIG. 1) with an audio function includes components such as an earpiece, a speaker, and a microphone, to implement sound transmission. To meet a performance requirement of a conventional terminal apparatus 100', a specific quantity of holes 110' with a specific aperture are usually formed on an exterior surface of the terminal apparatus 100'. The holes 110' formed above not only reduce refinement and appearance competitiveness of the terminal apparatus 100', but also cause external impurities (such as water and dust) to enter the inside of the terminal apparatus 100' through the hole 110' with the specific aperture. This affects audio performance of the terminal apparatus 100', and may even damage internal components of the terminal apparatus 100'; and furthermore, a machining process of the hole 110' is complicated. For example, in a drilling process, a to-be-processed workpiece may be broken due to a stress of a to-be-processed material. As a result, processing the hole 110' fails, or a formed hole wall is difficult to process into a smooth surface.

SUMMARY

In view of this, it is necessary to provide a terminal apparatus that has appearance competitiveness, prevents, or reduces external impurities from entering, and is easy to manufacture.

According to a first aspect, this application provides a terminal apparatus, including a first structural component, a second structural component, a third structural component, and at least one acoustic element, where the second structural component is located between the first structural component and the third structural component, and the first structural component, the second structural component, and the third structural component jointly surround and form a cavity; the acoustic element is accommodated in the cavity; at least one sound emission slot is formed between the first structural component and the second structural component and/or between the second structural component and the third structural component, the second structural component includes a first portion, a second portion, and a sound guide slot, the first portion and the second portion surround and form the sound guide slot, the first portion is connected to the first structural component, and the second portion is spaced apart from the first structural component to form the sound emission slot; and the sound guide slot is in communication with the sound emission slot, the sound emission slot is located on a side of the sound guide slot that faces away from the acoustic element, and the acoustic element transmits sound to the outside through the sound guide slot and the sound emission slot.

In the foregoing design, a sound emission slot is provided between two adjacent structural components without providing a hole on the structural components, and this effectively ensures integrity of the structural components, and improves refinement and appearance competitiveness of the terminal apparatus; in addition, a minimum width of the sound emission slot is less than a minimum diameter of the hole, and this effectively reduces a possibility of external impurities (such as water, dust, or the like) entering the inside of the terminal apparatus; a manufacturing process of forming the sound emission slot between two structural components is simpler than a process of forming a hole, and a stress of the structural component that needs to be overcome is small, and it is convenient to perform surface processing on the slot to form a smooth surface, which is more convenient for forming structural components; and in addition, at least one sound guide slot is provided on the second structural component, the second structural component is divided into a first portion and a second portion, and the first portion is connected to the first structural component. On the premise that sound transmission may be implemented, external impurities (such as dust, water, or the like) may further be reduced or prevented from entering into the terminal apparatus.

In a possible design, the terminal apparatus further includes a colloid, and the colloid is configured to connect the first portion and the first structural component.

In the foregoing design, the colloid not only plays the role of connecting the first portion and the first structural component, but also reduces or prevents external impurities (such as dust, water, or the like) from entering the terminal apparatus.

In a possible design, there are at least two sound guide slots, and the terminal apparatus further includes a blocking part, and the blocking part is located between two adjacent sound guide slots.

In the foregoing design, the blocking part is configured to separate the two adjacent sound guide slots, and reduce interference when sound passes through the two adjacent sound guide slots.

In a possible design, there are a plurality of sound emission slots, at least one of the sound emission slots is located between the first structural component and the second structural component, and at least one of the sound emission slots is located between the second structural component and the third structural component.

In the foregoing design, the sound emission slot is located between different structural components, to implement functions of the terminal apparatus, such as a stereo effect, sound emission, and sound pickup.

In a possible design, the at least one sound guide slot is in communication with at least two of the sound emission slots.

In the foregoing design, a plurality of sound emission slots share a same sound guide slot, and a same acoustic element may implement sound emission or sound pickup from the plurality of sound emission slots. This improves the sound emission or sound pickup effect of the acoustic element.

In a possible design, the first structural component is a display screen, the second structural component is a middle frame, and the third structural component is a housing.

In the foregoing design, there are some specific embodiments of the terminal apparatus.

In a possible design, the at least one sound emission slot is spaced between the housing and the middle frame.

In the foregoing design, the at least one sound emission slot is located on a side of the housing, to be specific, the sound emission slot is located on a back side of the terminal apparatus. In a process in which a user uses the terminal apparatus, a front side (a side on which the display screen is located) usually faces the user, and it is more difficult for the user to find the sound emission slot located on the back side (a side on which the housing is located). This further enhances refinement and appearance competitiveness of the terminal apparatus.

In a possible design, a through hole is provided on the middle frame, and the through hole is in communication with the acoustic element and the sound guide slot.

In the foregoing design, the through hole on the middle frame forms a part of a sound transmission channel, and is in communication with the acoustic element and the sound guide slot, so that sound emitted by the acoustic element is exported from the channel or sound from the outside is transmitted to the acoustic element through the channel.

In a possible design, the terminal apparatus further includes an exciter, and the exciter is fixed on the display screen and is located in the cavity to implement sound on display In the foregoing design, on the premise of improving the appearance competitiveness, a use effect of the user is improved.

In a possible design, the terminal apparatus includes a first surface, a side surface, and a second surface that are located on different planes, and the side surface is connected to the first surface and the second surface; a surface of the first structural component that faces away from the third structural component is a curved surface, the curved surface includes the first surface and a part of the side surface, and the sound emission slot is located on the side surface; or a surface of the third structural component that faces away from the first structural component is a curved surface, the curved surface includes the second surface and a part of the side surface, and the sound emission slot is located on the side surface.

In the foregoing design, when a surface of one of the structural components of the terminal apparatus is the curved surface, the sound emission slot is located on the side surface, and it is more difficult for the user to find the sound emission slot in a process in which the user uses the terminal apparatus. This further enhances refinement and appearance competitiveness of the terminal apparatus.

In a possible design, the at least one sound emission slot is formed by the first structural component being recessed in a direction that faces away from the second structural component; and/or the sound emission slot is formed by the second structural component being recessed in a direction that faces away from the first structural component; and/or the sound emission slot is formed by the first structural component being recessed in a direction that faces away from the second structural component and the second structural component being recessed in a direction that faces away from the first structural component.

In the foregoing design, a structure that may be formed by the sound emission slot may be formed by the first structural component and/or the second structural component that recesses as required.

In a possible design, the at least one sound emission slot is formed by the third structural component being recessed in a direction that faces away from the second structural component; and/or the sound emission slot is formed by the second structural component being recessed in a direction that faces away from the third structural component; and/or the sound emission slot is formed by the third structural component being recessed in a direction that faces away from the second structural component and the second structural component being recessed in a direction that faces away from the third structural component.

In the foregoing design, a structure that may form the sound emission slot may be formed by the second structural component and/or the third structural component that recesses as required.

In a possible design, the acoustic element includes at least one of an earpiece, a microphone, and a speaker.

In a possible design, the second structural component and the third structural component are an integral structure.

According to a second aspect, this application provides a terminal apparatus, including a first structural component, a second structural component, a third structural component, at least one acoustic element, and an exciter, where the first structural component, the second structural component, and the third structural component jointly surround and form a cavity, and at least one sound emission slot is formed between the second structural component and the third structural component; the acoustic element is accommodated in the cavity; the exciter is fixedly connected to the first structural component and is located in the cavity, and is configured to excite the first structural component to emit sound, where the terminal apparatus further includes a sound guide slot, the sound guide slot is in communication with the sound emission slot, the sound emission slot is located on a side of the sound guide slot that faces away from the acoustic element, and the acoustic element transmits sound to the outside through the sound guide slot and the sound emission slot.

In the foregoing design, a sound emission slot is provided between two adjacent structural components without providing a hole on the structural components, and this effectively ensures integrity of the structural components, and improves refinement and appearance competitiveness of the terminal apparatus; in addition, a minimum width of the sound emission slot is less than a minimum diameter of the hole, and this effectively reduces a possibility of external impurities (such as water, dust, or the like) entering the inside of the terminal apparatus; a manufacturing process of forming the sound emission slot between two structural components is simpler than a process of forming a hole, and a stress of the structural component that needs to be overcome is small, and it is convenient to perform surface processing on the slot to form a smooth surface, which is more convenient for forming structural components; and In addition, at least one sound emission slot is provided between the second structural component and the third structural component, and the exciter is fixed on the first structural component that faces away from the third structural component, to ensure the use effect of the user under the premise of improving the appearance competitiveness.

In a possible design, the first structural component is a display screen, the second structural component is a middle frame, the third structural component is a housing, and the at least one sound emission slot is located between the middle frame and the housing.

In the foregoing design, there are some specific embodiments of the terminal apparatus.

In a possible design, there are at least two sound guide slots, and the terminal apparatus further includes a blocking part, and the blocking part is located between two adjacent sound guide slots.

In the foregoing design, the blocking part is configured to separate the two adjacent sound guide slots, and reduce interference when sound passes through the two adjacent sound guide slots.

In a possible design, the second structural component includes a first portion, a second portion, and a sound guide slot, the first portion and the second portion surround and form the sound guide slot, the first portion is connected to the third structural component, and the second portion is spaced apart from the third structural component to form the sound emission slot.

In the foregoing design, at least one sound guide slot is provided on the second structural component, the second structural component is divided into a first portion and a second portion, and the first portion is connected to the third structural component. On the premise that sound transmission may be implemented, external impurities (such as dust, water, or the like) may further be reduced or prevented from entering into the terminal apparatus.

In a possible design, the at least one sound emission slot is formed by the third structural component being recessed in a direction that faces away from the second structural component; and/or the sound emission slot is formed by the second structural component being recessed in a direction that faces away from the third structural component; and/or the sound emission slot is formed by the third structural component being recessed in a direction that faces away from the second structural component and the second structural component being recessed in a direction that faces away from the third structural component.

In the foregoing design, a structure that may form the sound emission slot may be formed by the first structural component and/or the second structural component and/or the third structural component that recesses as required.

In a possible design, at least one sound emission slot is located between the first structural component and the second structural component.

In the foregoing design, the sound emission slot may further be located between the first structural component and the second structural component.

In a possible design, the at least one sound guide slot is in communication with at least two of the sound emission slots.

In the foregoing design, a plurality of sound emission slots share a same sound guide slot, and a same acoustic element may implement sound emission or sound pickup from the plurality of sound emission slots. This improves the sound emission or sound pickup effect of the acoustic element.

In a possible design, the acoustic element includes at least one of an earpiece, a microphone, and a speaker.

According to a third aspect, this application provides a terminal apparatus, including a first surface, a side surface, and a second surface that are located on different planes, the side surface is connected to the first surface and the second surface, the terminal apparatus includes at least two structural components and at least one acoustic element, and the at least two structural components surround and form a cavity; the acoustic element is accommodated in the cavity; at least one sound emission slot is formed between two adjacent structural components, the terminal apparatus further includes a sound guide slot, the sound guide slot is in communication with the sound emission slot, the sound emission slot is located on a side of the sound guide slot that faces away from the acoustic element, at least one of the sound emission slots is located on the side surface, and the acoustic element transmits sound to the outside through the sound guide slot and the sound emission slot.

In the foregoing design, a sound emission slot is provided between two adjacent structural components without providing a hole on the structural components, and this effectively ensures integrity of the structural components, and improves refinement and appearance competitiveness of the terminal apparatus; in addition, a minimum width of the sound emission slot is less than a minimum diameter of the hole, and this effectively reduces a possibility of external impurities (such as water, dust, or the like) entering the inside of the terminal apparatus; a manufacturing process of forming the sound emission slot between two structural components is simpler than a process of forming a hole, and a stress of the structural component that needs to be overcome is small, and it is convenient to perform surface processing on the slot to form a smooth surface, which is more convenient for forming structural components; and in addition, the sound emission slot is provided on the side surface of the terminal apparatus. In a process in which the user uses the terminal apparatus, usually a side surface does not face the user, and it is more difficult for the user to find the sound emission slot. This further enhances refinement and appearance competitiveness of the terminal apparatus.

In a possible design, the terminal apparatus includes a first structural component, a second structural component, and a third structural component, the first structural component is a display screen, the second structural component is a middle frame, the third structural component is a housing, the second structural component is located between the first structural component and the third structural component, the first structural component, the second structural component, and the third structural component surround and form the cavity, a surface of the first structural component that faces away from the third structural component includes the first surface and a part of the side surface, and the sound emission slot is located between the first structural component and the second structural component.

In the foregoing design, the terminal apparatus includes a curved display screen, and the sound emission slot is provided on the side surface of the terminal apparatus. This further enhances refinement and appearance competitiveness of the terminal apparatus.

In a possible design, the second structural component includes a first portion, a second portion, and a sound guide slot, the first portion and the second portion surround and form the sound guide slot, the first portion is connected to the first structural component, and the second portion is spaced apart from the first structural component to form the sound emission slot.

In the foregoing design, at least one sound guide slot is provided on the second structural component, the second structural component is divided into a first portion and a second portion, and the first portion is connected to the first structural component. On the premise that sound transmission may be implemented, external impurities (such as dust, water, or the like) may further be reduced or prevented from entering into the terminal apparatus.

In a possible design, the terminal apparatus further includes a colloid, and the colloid is configured to connect the first portion and the first structural component.

In the foregoing design, the colloid not only plays the role of connecting the first portion and the first structural component, but also reduces or prevents external impurities (such as dust, water, or the like) from entering the terminal apparatus.

In a possible design, the terminal apparatus includes a first structural component, a second structural component, and a third structural component, the first structural component is a display screen, the second structural component is a middle frame, the third structural component is a housing, the second structural component is located between the first structural component and the third structural component, the first structural component, the second structural component, and the third structural component jointly surround and form the cavity, a surface of the third structural component that faces away from the first structural component includes the sound surface and a part of the side surface, and the sound emission slot is located between the third structural component and the second structural component.

In the foregoing design, a housing of the terminal apparatus is a curved surface structure, and the sound emission slot is provided on the side surface of the terminal apparatus. This further enhances refinement and appearance competitiveness of the terminal apparatus.

In a possible design, the second structural component includes a first portion, a second portion, and a sound guide slot, the first portion and the second portion surround and form the sound guide slot, the first portion is connected to the third structural component, and the second portion is spaced apart from the third structural component to form the sound emission slot.

In the foregoing design, at least one sound guide slot is provided on the second structural component, the second structural component is divided into a first portion and a second portion, and the first portion is connected to the third structural component. On the premise that sound transmission may be implemented, external impurities (such as dust, water, or the like) may further be reduced or prevented from entering into the terminal apparatus.

In a possible design, the terminal apparatus further includes a colloid, and the colloid is configured to connect the first portion and the first structural component.

In the foregoing design, the colloid not only plays the role of connecting the first portion and the third structural component, but also reduces or prevents external impurities (such as dust, water, or the like) from entering the terminal apparatus.

In a possible design, the terminal apparatus further includes an exciter, and the exciter is fixed on the display screen and is located in the cavity to implement sound on display In the foregoing design, on the premise of improving the appearance competitiveness, a use effect of the user is improved.

In a possible design, there are at least two sound guide slots, and the terminal apparatus further includes a blocking part, and the blocking part is located between two adjacent sound guide slots.

In the foregoing design, the blocking part is configured to separate the two adjacent sound guide slots, and reduce interference when sound passes through the two adjacent sound guide slots.

In a possible design, there are a plurality of sound emission slots, and at least one sound guide slot is in communication with at least two of the sound emission slots.

In the foregoing design, a plurality of sound emission slots share a same sound guide slot, and a same acoustic element may implement sound emission or sound pickup from the plurality of sound emission slots. This improves the sound emission or sound pickup effect of the acoustic element.

In a possible design, the acoustic element includes at least one of an earpiece, a microphone, and a speaker.

In a possible design, the terminal apparatus further includes a sealing ring, where the sealing ring that is located between the acoustic element and the second structural component.

In the foregoing design, the sealing ring reduces or prevents the acoustic element from sound leakage.

In a possible design, the terminal apparatus further includes a dustproof component, and the dustproof component is located in the sealing ring.

In the foregoing design, the dustproof component is configured to prevent the external impurities from contaminating the acoustic element.

LIST OF REFERENCE NUMERALS

Figure 1:
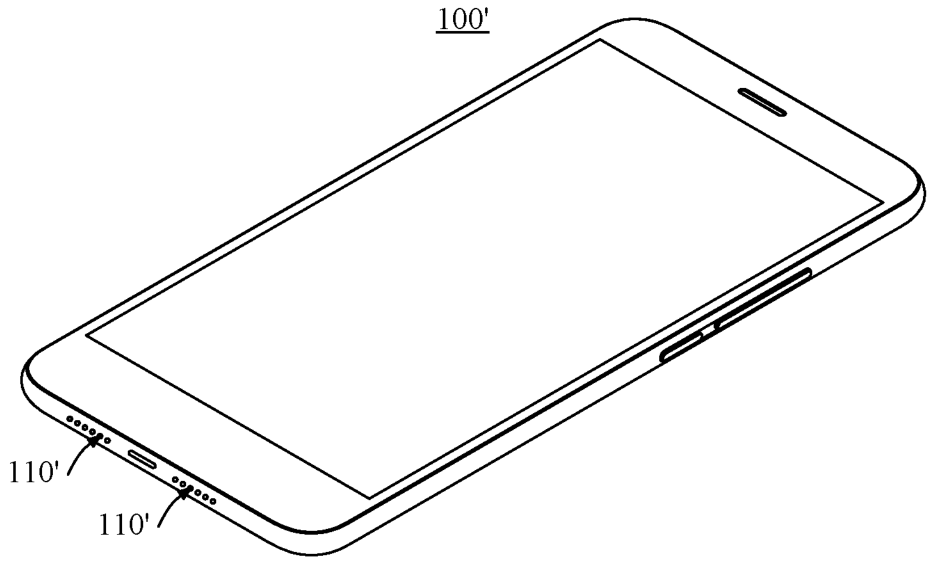
FIG. 1 is a schematic diagram of a structure of a terminal apparatus that implements sound transmission through a hole provided in the related art.

Terminal apparatus: 100'
Mobile phone: 100, 100*a*, 100*b*, 100*c*, 100*d*, 100*e*, 100*f*, 100*g*, and 100*h*
Hole: 110'
Structural component: 10
Cavity: 11
Sound emission slot: 13
First sound emission slot: 131
Second sound emission slot: 132 and 132*b*
Third sound emission slot: 133 and 133*b*
Acoustic element: 15
First surface: 16
Second surface: 17
Side surface: 18
Display screen 20
Back adhesive: 21
Exciter: 23
Middle frame: 30
Frame: 31
Upper frame part: 311
Lower frame part: 313
Middle plate: 32
First through hole: 321
Second through hole: 322
Third through hole: 323
Fourth through hole: 324
First groove: 33
Second groove: 34
Blocking part: 35 and 35*b*
First portion: 36 and 36*a*
Second portion: 37 and 37*a*
Colloid: 38 and 38*a*
Avoidance groove: 39
Housing: 40
Earpiece: 50
Microphone: 60
First microphone: 61
Second microphone: 63
Speaker: 70
Circuit board: 80
First circuit board: 81
First microphone hole: 812
Second circuit board: 82
Second microphone hole: 822
Sealing ring: 83
Dustproof component: 86
First sound guide slot: 91
Second sound guide slot: 92
Third sound guide slot: 93
Fourth sound guide slot: 94
Fifth sound guide slot: 95
Sixth sound guide slot: 96
Seventh sound guide slot: 97
First channel: A
Second channel: B
Third channel: C
Fourth channel: D
Fifth channel: E
Sixth channel: F

DETAILED DESCRIPTION OF ILLUSTRATIVE EMBODIMENTS

To better understand the foregoing objective, features, and advantages of this application, the following describes this application in detail with reference to the accompanying drawings and specific implementations. It should be noted that the implementations in this application and features in the implementations may be combined with each other in the case of no conflict. In the following description, many specific details are provided to facilitate a full understanding of this application. The described implementations are only some of the implementations of this application, but not all of the implementations.

Unless otherwise defined, meanings of all technical and scientific terms used in this specification are the same as those usually understood by a person skilled in the art to which this application belongs. In this application, terms used in the specification of this application are merely intended to describe objectives of specific implementations, but are not intended to limit this application. The term "and/or" used in this specification includes any and all combinations of one or more related listed items.

In the embodiments of this application, for convenience of description and not to limit this application, the term "connection" used in the specification and claims of this application is not limited to physical or mechanical connection, no matter it is direct or indirect. "Up", "down", "above", "below", "left", "right" and the like are only used to represent a relative position relationship. When an absolute position of the described object changes, a relative position relationship also changes accordingly.

Figure 2:
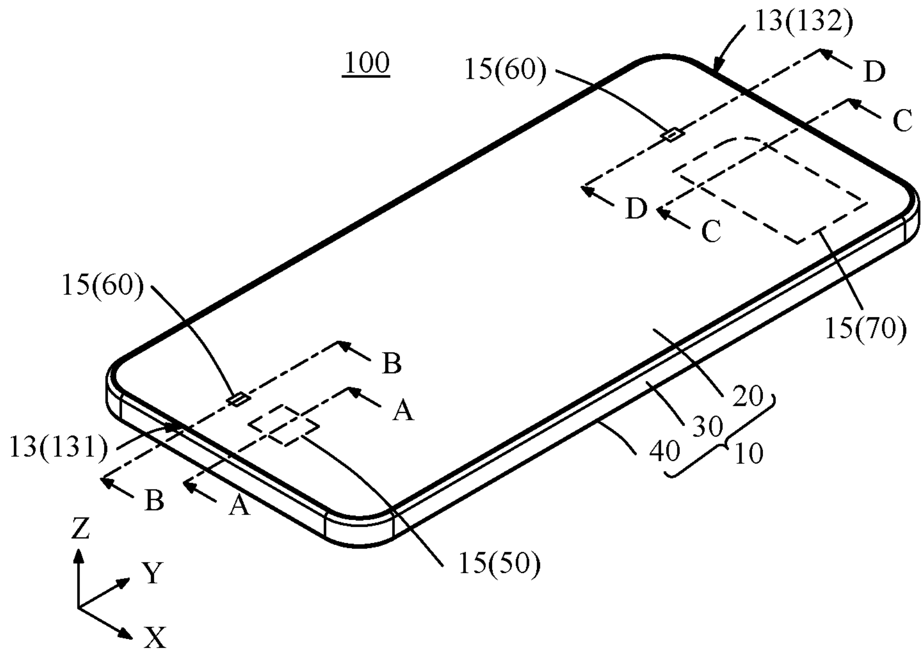
FIG. 2 is a schematic diagram of a structure of a terminal apparatus according to some embodiments of this application.

The embodiments of this application provide a schematic diagram of a structure of a terminal apparatus. The terminal apparatus may be an electronic product with an audio function such as a mobile phone, a smart watch, a bracelet, a tablet computer, a notebook computer, a driving recorder, a wearable device, a walkie-talkie, a Bluetooth headset, or a Bluetooth speaker. Referring to FIG. 2, in this embodiment, a description is made by using the terminal apparatus as a mobile phone 100. For ease of description, a thickness direction of the mobile phone 100 is defined as a Z-axis direction, a short-side direction is defined as an X-axis direction, a long-side direction is defined as a Y-axis direction, and a plane determined by the X-axis direction and the Y-axis direction is defined as an XY plane.

Figure 3:
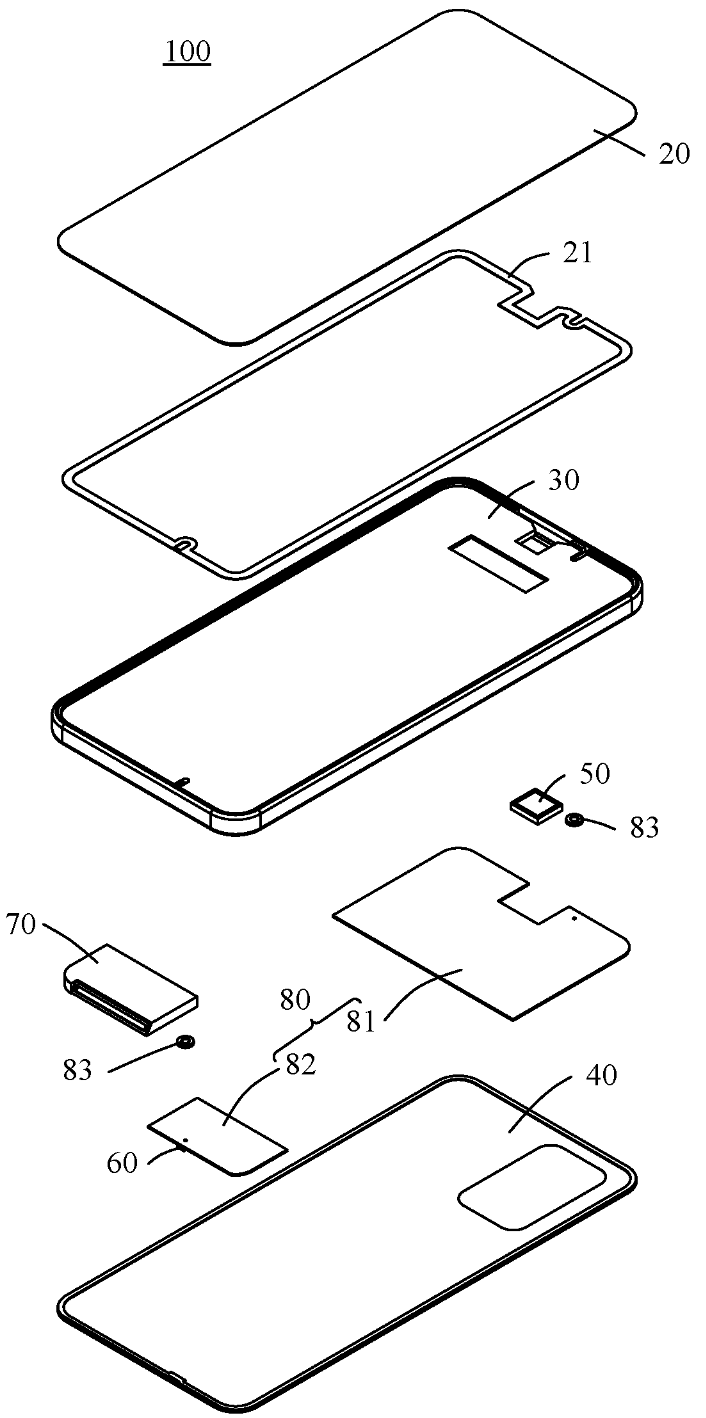
FIG. 3 is an exploded view of the terminal apparatus shown in FIG. 2.
Figure 4:
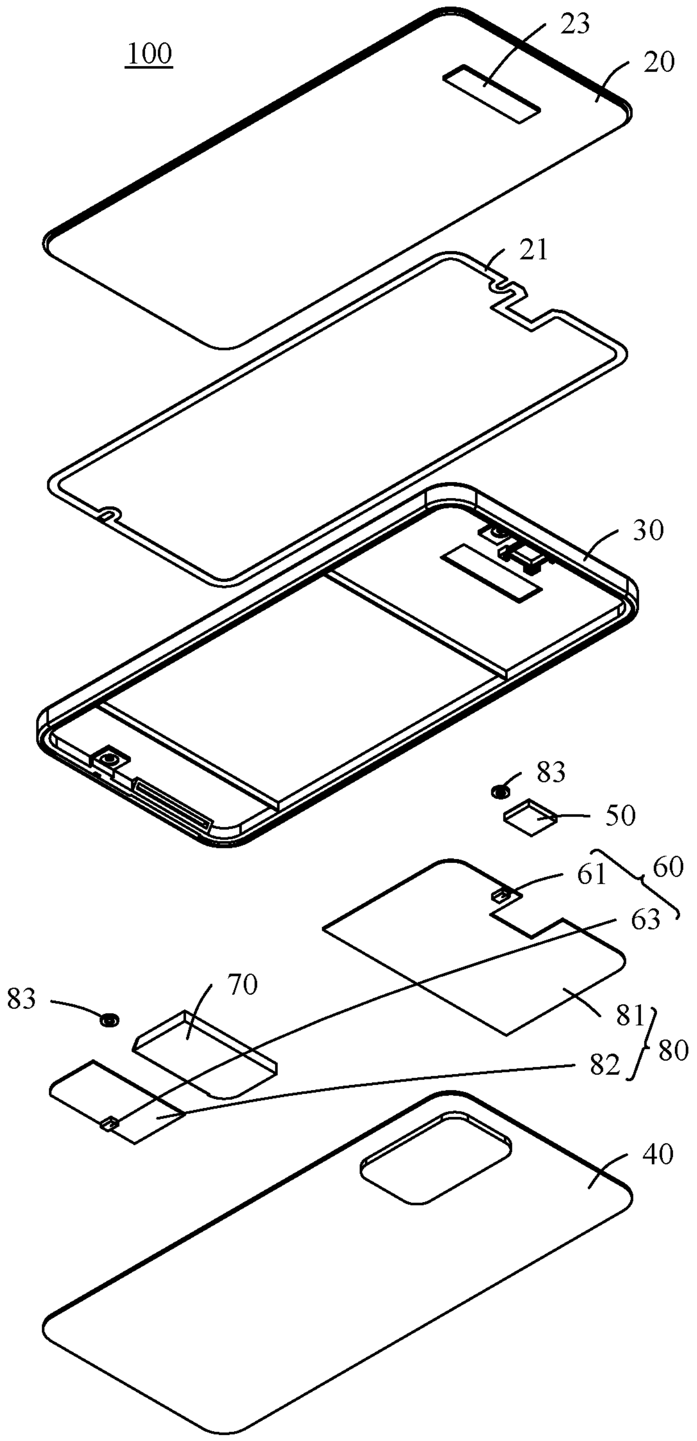
FIG. 4 is an exploded view of another orientation of the terminal apparatus shown in FIG. 3.

Both FIG. 3 and FIG. 4 are exploded views of the mobile phone 100 shown in FIG. 2. To implement an audio function of the terminal apparatus, the terminal apparatus may include an acoustic element 15 for an audio function such as an earpiece 50, a microphone 60, and/or a speaker 70. There are at least one acoustic elements 15 in the terminal apparatus. In a specific embodiment, the quantity of acoustic elements 15 such as the earpiece 50, the microphone 60, and the speaker 70 may be arranged as required, and may be one or more, and may further be omitted as required in some embodiments. For example, when the terminal apparatus is the mobile phone 100, the earpiece 50, the microphone 60, and the speaker 70 may be simultaneously arranged in the mobile phone 100. When the terminal apparatus is the tablet computer, the microphone 60 and the speaker 70 may be arranged in the tablet computer, to be specific, the earpiece 50 does not need to be arranged in the tablet computer. Positions of the acoustic elements 15 such as the earpiece 50, the microphone 60, and the speaker 70 in the terminal apparatus may also be arranged as required. For example, in some embodiments, using the mobile phone 100 as an example, the earpiece 50 is usually arranged on a side close to a camera, namely, a top part of the mobile phone 100. The microphone 60 may be arranged on a side that faces away from the camera, namely, a bottom part of the mobile phone 100. It may be understood that the above are only examples, and are not limited thereto The terminal apparatus further includes at least two structural components 10. The structural components 10 are located on an outer surface of the terminal apparatus, and the at least two structural components 10 are combined with each other to form a cavity 11 (refer to FIG. 5). The cavity 11 may be configured to accommodate the acoustic elements 15 such as the earpiece 50, the microphone 60, and the speaker 70, and the cavity 11 may further be configured to accommodate other components, such as a battery, a circuit board, and the like. At least one sound emission slot 13 is formed between two adjacent structural components 10, a sound guide slot is further provided inside the terminal apparatus, the sound guide slot is in communication with the sound emission slot 13, and the acoustic element 15 may transmit sound to the outside through the sound guide slot and the sound emission slot 13. The sound emission slot 13 is provided between the two adjacent structural components 10 without providing a hole on the structural components 10, and this effectively ensures integrity of the structural components 10, and improves refinement and appearance competitiveness of the terminal apparatus; in addition, a minimum width of the sound emission slot 13 is less than a minimum diameter of the hole, and this effectively reduces a possibility of external impurities (such as water, dust, or the like) entering the inside of the terminal apparatus. In some embodiments, a width of the sound emission slot 13 may range from 0.1 mm to 0.5 mm, such as 0.2 mm, 0.3 mm, 0.4 mm, or the like, which is less than a diameter of the hole in the related art, to effectively reduce or prevent impurities such as dust or water from entering the inside of the terminal apparatus; and a manufacturing process of forming the sound emission slot 13 between the two structural components 10 is simpler than a process of forming a hole, and a stress of the structural component 10 that needs to be overcome is small, and it is convenient to perform surface processing on the slot to form a smooth surface, which is more convenient for forming structural components 10.

In some embodiments, the terminal apparatus includes three structural components fixed to each other. For ease of description, the three structural components 10 of the terminal apparatus are respectively defined as a first structural component, a second structural component, and a third structural component. The first structural component, the second structural component, and the third structural component are three separate parts, to be specific, the first structural component, the second structural component, and the third structural component are not integrally formed, but may be fixed into a whole through bonding, clamping, or the like.

Refer to FIG. 2 to FIG. 4 again. When the terminal apparatus is the mobile phone 100, the mobile phone 100 may include a display screen 20, a middle frame 30, a housing 40, an earpiece 50, a microphone 60, a speaker 70, and a circuit board 80. The middle frame 30 is located between the display screen 20 and the housing 40, the display screen 20, the middle frame 30, and the housing 40 are located on an outer surface of the terminal apparatus. The display screen 20, the middle frame 30, and the housing 40 are stacked along a Z-axis direction and form a hollow structure inside. The earpiece 50, the microphone 60, the speaker 70, and the circuit board 80 are located in a cavity 11 formed by the display screen 20, the middle frame 30, and the housing 40. In other words, in this embodiment, the first structural component is the display screen 20, the second structural component is the middle frame 30, and the third structural component is the housing 40. The acoustic element 15 includes the earpiece 50, the microphone 60, and the speaker 70. When a user uses the mobile phone 100 (namely, the terminal apparatus), usually the display screen 20 (namely, the first structural component) faces the user, and the housing 40 (namely, the third structural component) faces away from the user. When the terminal apparatus is the mobile phone 100, a quantity and specific names of the structural components 10 and the acoustic elements 15 are only examples. In other embodiments, the quantity and specific names of the structural components 10 and the acoustic elements 15 may be changed according to specific types of terminal apparatuses. In some embodiments, the middle frame 30 and the housing 40 may further be integrally formed. In other words, the integrally formed middle frame 30 and housing 40 are equivalent to a structural component 10.

The display screen 20 may be an organic light-emitting diode (Organic Light-Emitting Diode, OLED) display screen 20, or may be a liquid crystal display screen (Liquid Crystal Display, LCD). The display screen 20 may include a display and a touch device, the display is configured to output display content to the user, and the touch device is configured to receive a touch event input by the user on the display screen 20.

A material of the housing 40 may be metal, glass, plastic, ceramic, or a combination of the foregoing materials, and a specific material type is not limited. In this embodiment, the housing 40 is a battery case. In other embodiments, the housing 40 is not limited to the battery case, and may be arranged according to specific types of terminal apparatuses.

Figure 5:
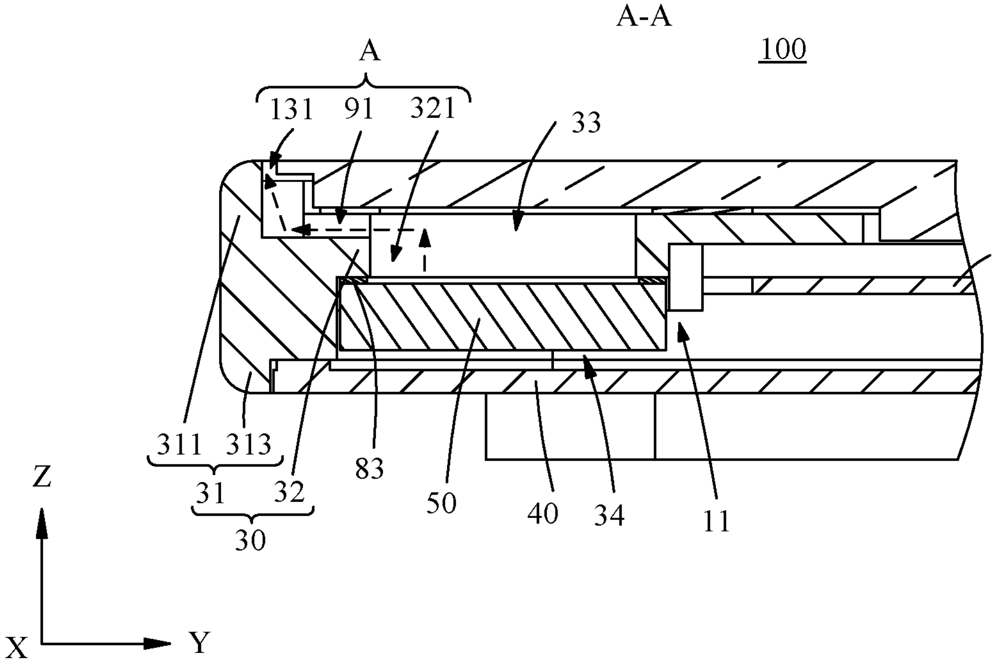
FIG. 5 is a schematic cross-sectional view of the terminal apparatus shown in FIG. 2 along a direction A-A.

FIG. 5 is a cross-sectional view along a direction A-A in FIG. 2. A middle frame 30 includes a frame 31 and a middle plate 32. The middle plate 32 is located in an XY plane. The frame 31 is in an annular shape and surrounds the middle plate 32. The frame 31 protrudes along a Z-axis direction on two sides of the middle plate 32. The frame 31 and the middle plate 32 may be integrally formed, or may be fixed into an integral structure through welding, clipping, bonding, or the like.

The frame 31 includes an upper frame part 311 and a lower frame part 313 that are oppositely arranged. The upper frame part 311 and the lower frame part 313 are respectively located on opposite sides of the middle plate 32 and are connected to the middle plate 32. In other word, the upper frame part 311 and the middle plate 32 form a first groove 33, and the lower frame part 313 and the middle plate 32 form a second groove 34. The first groove 33 may be configured to accommodate a display screen 20 and an acoustic element 15, and the second groove 34 may be configured to accommodate a housing 40 and the acoustic element 15.

The display screen 20 is fixedly connected to the middle frame 30. In this embodiment, refer to FIG. 6, a mobile phone 100 includes a back adhesive 21, and the back adhesive 21 is arranged on a surface of the middle plate 32 in an annular shape. The back adhesive 21 is located in the first groove 33, and the back adhesive 21 bonds the display screen 20 and the middle frame 30. The annular back adhesive 21 may reduce or prevent external impurities (water, sweat, dust, or the like) from entering the mobile phone 100. In other embodiments, the display screen 20 and the middle frame 30 may also be fixedly connected by an adhesive dispensing process or a combination of the adhesive dispensing process and the back adhesive 21.

The back adhesive 21 in an area in which an earpiece 50, a microphone 60, and a speaker 70 need to be arranged recesses toward a direction that faces away from the frame 31 in an XY plane (refer to FIG. 3 or FIG. 4). In other words, the annular back adhesive 21 recesses toward an annular center, to reserve a part of the area for arranging the earpiece 50, the microphone 60, and the speaker 70. This prevents the back adhesive 21 from blocking a channel for transmitting sound, thereby affecting a sound emission or sound pickup effect; and in addition, the annular back adhesive 21 surrounds a periphery of a sound guide slot and a periphery of a sound emission slot 13 to seal the sound guide slot and the sound emission slot 13, so that sound is transmitted in the sound guide slot and the sound emission slot 13, to prevent the sound from entering the inside of the mobile phone 100 and affecting the sound emission or sound pickup effect.

The housing 40 is fixedly connected to the middle frame 30. In this embodiment, the housing 40 and the middle frame 30 are also fixedly connected by the back adhesive (not shown in the figure), so that the housing 40 is fixed in the second groove 34. In other embodiments, the housing 40 and the middle frame 30 may also be fixedly connected by an adhesive dispensing process or a combination of the adhesive dispensing process and the back adhesive 21.

In other embodiments, the middle frame 30 and the housing 40 may further be an integral structure.

In other embodiments, formation of the display screen 20, the middle frame 30, and the housing 40 is not limited to the foregoing structure. The structural components 10 such as the display screen 20, the middle frame 30, and the housing 40 may surround and form a cavity 11 capable of accommodating at least components such as the earpiece 50, the microphone 60, the speaker 70, and the circuit board 80.

Refer to FIG. 5 again. The earpiece 50 is located in the second groove 34 and between the middle plate 32 and the housing 40. The earpiece 50 is fixed on the middle frame 30, and the earpiece 50 may be fixed on the middle frame 30 through bonding, clamping, or other fixing components, and a specific fixing manner is not limited. A first through hole 321 is provided on the middle plate 32, and the first through hole 321 passes through the middle plate 32 along a Z-axis direction. In other words, the first groove 33 and the second groove 34 are in communication with each other through the first through hole 321. The earpiece 50 is located in the second groove 34 and covers the first through hole 321, to be specific, at least a part of the earpiece 50 is exposed to the first through hole 321 along the Z-axis direction.

Along the Z-axis direction, the middle plate 32 in an area that roughly corresponds to the earpiece 50 and is spaced apart from the display screen 20 to form a first sound guide slot 91, and an upper frame part 311 is spaced apart from the display screen 20 to form a first sound emission slot 131. In other words, the first sound emission slot 131 is located on an exterior surface of the mobile phone 100, and the upper frame part 311 is connected to an area of the display screen 20 in which the first sound emission slot 131 is not provided. The first sound guide slot 91 extends along an X-axis direction to form a slender slot. The first sound emission slot 131 is located between two adjacent structural components 10. The first sound guide slot 91 is in communication with the first through hole 321 and the first sound emission slot 131, to jointly form a first channel A. The earpiece 50 emits sound through the first channel A (namely the first through hole 321, the first sound guide slot 91, and the first sound emission slot 131), to transmit the sound emitted by the earpiece 50 to the outside of the mobile phone 100.

Specifically, in this embodiment, a surface of the middle plate 32 is adjacent to the frame 31, and a surface on which the earpiece 50 is arranged and facing the display screen 20 recesses toward a direction that faces away from the display screen 20 along the Z-axis direction, so that the middle plate 32 is spaced apart from the display screen 20, thereby forming the first sound guide slot 91. The first sound guide slot 91 may be formed by the middle plate 32 and/or the display screen 20 that recesses.

The upper frame part 311 recesses toward a direction that faces away from the display screen 20 along a Y-axis direction, so that the upper frame part 311 is spaced apart from the display screen 20, to form the first sound emission slot 131. In some embodiments, alternatively, the display screen 20 may recess along a direction that faces away from the upper frame part 311 along the Y-axis direction, so that the upper frame part 311 is spaced apart from the display screen 20, to form the first sound emission slot 131. In some implementations, alternatively, the upper frame part 311 recesses toward the direction that faces away from the display screen 20 along the Y-axis direction, and the display screen 20 recesses toward the direction that faces away from the upper frame part 311 along the Y-axis direction, so that the upper frame part 311 is spaced apart from the display screen 20, to form the first sound emission slot 131.

In some embodiments, the terminal apparatus may further include a sealing ring 83. The sealing ring 83 is arranged at the acoustic element 15 that needs to prevent sound leakage, to reduce or prevent the acoustic element 15 from sound leakage. In this embodiment, the sealing ring 83 is located between the earpiece 50 and the middle plate 32 and connects the earpiece 50 and the middle plate 32. The sealing ring 83 is arranged on a surface of the earpiece 50 that faces the middle plate 32 in an annular shape. The sealing ring 83 is configured to seal the earpiece 50 and the middle plate 32, to prevent sound leakage and reduce or avoid external impurities (such as water, sweat, dust, or the like) from entering the inside of the terminal apparatus. The sealing ring 83 may be a back adhesive, foam, or the like, and may also be sealed by an adhesive dispensing process.

Referring to FIG. 5 and with reference to FIG. 3, the circuit board 80 is accommodated in the second groove 34. The circuit board 80 is located between the middle plate 32 and the housing 40, and the circuit board 80 may be fixed on the middle frame 30 through a fixing component (such as a nut). In this embodiment, there are two circuit boards 80. In other words, the circuit board 80 includes a first circuit board 81 and a second circuit board 82. The first circuit board 81 is spaced apart from the second circuit board 82 along the Y-axis direction. In other embodiments, the quantity of circuit boards 80 is not limited, and may be one or more.

Figure 6:
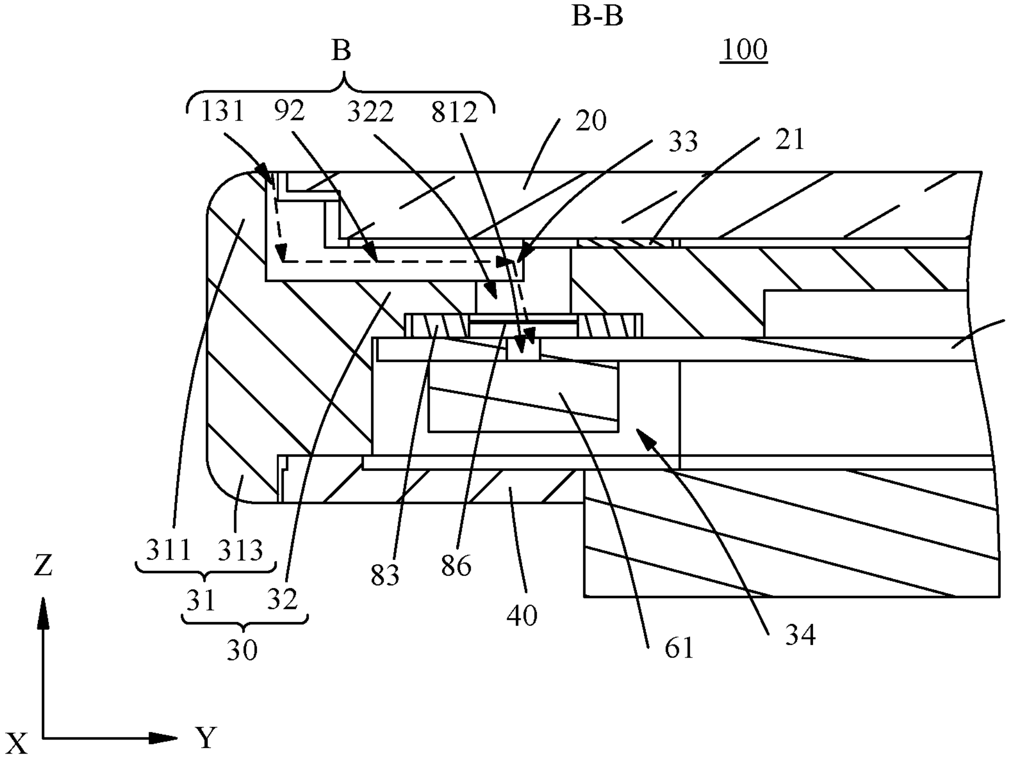
FIG. 6 is a schematic cross-sectional view of the terminal apparatus shown in FIG. 2 along a direction B-B.

Referring to FIG. 6 and with reference to FIG. 2 and FIG. 3, FIG. 6 is a schematic cross-sectional view along a direction B-B in FIG. 2. The microphone 60 is accommodated in the second groove 34, and the microphone 60 is fixed on a side of the circuit board 80 that faces away from the middle plate 32. In this embodiment, the quantity of microphones 60 is two. In other words, the microphone 60 includes a first microphone 61 and a second microphone 63. The first microphone 61 is fixed on the first circuit board 81, and the second microphone 63 is fixed on the second circuit board 82.

The first circuit board 81 is located on a side of the earpiece 50, and the first microphone 61 is fixed on an area of the first circuit board 81 that is adjacent to the earpiece 50. A first microphone hole 812 is provided on the first circuit board 81, and the first microphone 61 covers the first microphone hole 812, to be specific, at least a part of the first microphone 61 is exposed to the first microphone hole 812 along the Z-axis direction. A second through hole 322 is provided on the middle plate 32, and the second through hole 322 passes through the middle plate 32 along the Z-axis direction. The first microphone hole 812 is in communication with the second through hole 322, so as to be in communication with the first groove 33.

Along the Z-axis direction, the middle plate 32 in an area that roughly corresponds to the first microphone 61 and is spaced apart from the display screen 20 to form a second sound guide slot 92. The first sound emission slot 131 formed by the upper frame part 311 and the display screen 20 that are spaced apart also extends to an area in which the first microphone 61 is located, so that the first sound emission slot 131 is in communication with the second sound guide slot 92. The first microphone hole 812, the second through hole 322, the second sound guide slot 92, and the first sound emission slot 131 are in communication with each other to form a second channel B. The sound in the outside may pass through through the second channel B (namely, the first sound emission slot 131, the second sound guide slot 92, the second through hole 322, and the first microphone hole 812), to transmit the sound in the outside to the first microphone 61 to implement sound pickup. An arrangement manner of the second sound guide slot 92 may be the same as an arrangement manner of the first sound guide slot 91. To be specific, the second sound guide slot 92 may be formed by the middle plate 32 and/or the display screen 20 that recesses.

Refer to FIG. 2, FIG. 5, and FIG. 6, in the XY plane, the first sound emission slot 131 is simultaneously in communication with the first sound guide slot 91 and the second sound guide slot 92. In other words, the first channel A and the second channel B share the first sound emission slot 131. In some embodiments, the first channel A and the second channel B may not share the first sound emission slot 131.

Figure 7:
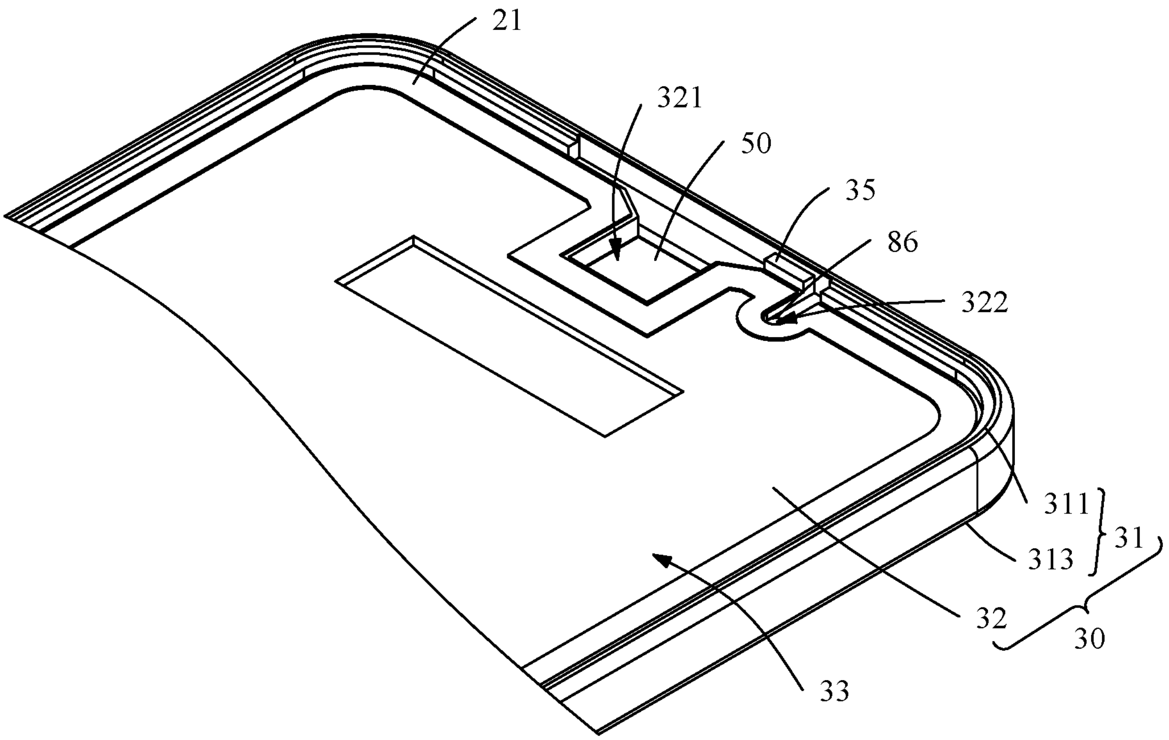
FIG. 7 is a schematic diagram of a partial internal structure of the terminal apparatus shown in FIG. 2.

Referring to FIG. 7, in some embodiments, a middle frame 30 further includes a blocking part 35. The blocking part 35 is arranged on a side on which a first groove 33 is located. The blocking part 35 is arranged in an area in which a middle plate 32 and an upper frame part 311 are connected to each other, and is located between a first sound guide slot 91 and a second sound guide slot 92. The blocking part 35 is configured to separate the first sound guide slot 91 and the second sound guide slot 92, to reduce mutual interference of sound passing through a first channel A and a second channel B.

Referring to FIG. 6, in some embodiments, a sealing ring 83 is arranged between a first circuit board 81 and the middle plate 32, and the sealing ring 83 is arranged in an annular shape on a surface of the first circuit board 81 that faces the middle plate 32. A first microphone hole 812 is exposed to the sealing ring 83, and the sealing ring 83 is configured to seal the first circuit board 81 and the middle plate 32, to prevent a first microphone 61 from sound leakage.

In some embodiments, the terminal apparatus may further include a dustproof component 86, and the dustproof component 86 is arranged at an acoustic element 15 required for dustproofing. Referring to FIG. 6, in this embodiment, the dustproof component 86 is arranged inside the annular sealing ring 83, and a projection of the dustproof component 86 along the Z-axis direction covers the first microphone hole 812. The dustproof component 86 may be a structure such as a dustproof net, a waterproof breathable membrane, or the like. The dustproof component 86 is configured to prevent external impurities (such as water, sweat, dust, or the like) from contaminating the first microphone 61 and causing the first microphone 61 to fail.

Figure 8:
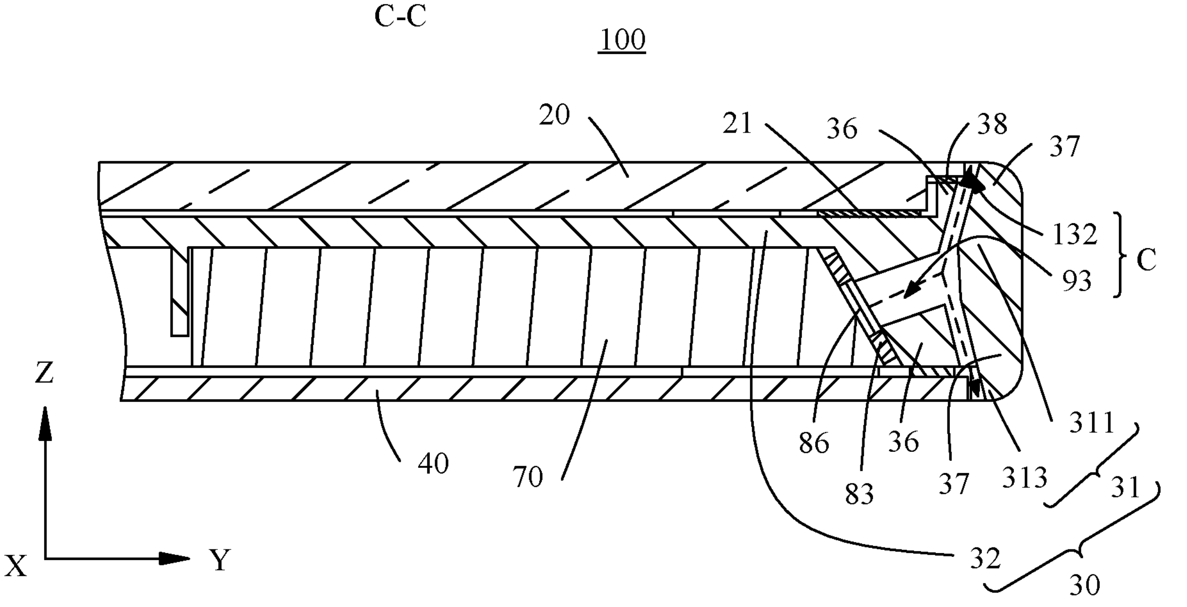
FIG. 8 is a schematic cross-sectional view of the terminal apparatus shown in FIG. 2 along a direction C-C.

FIG. 8 is a cross-sectional view along a direction C-C in FIG. 2. A speaker 70 is located in a second groove 34 and between a middle plate 32 and a housing 40. The speaker 70 is fixed on a middle frame 30, the speaker 70 may be fixed on the middle frame 30 through bonding, clamping, or other fixing components, and a specific fixing manner is not limited.

The speaker 70 is configured to convert an electrical signal into a sound signal. The speaker 70 includes a vibrating film, a voice coil, and a magnet. The voice coil is connected to a vibrating film, and the voice coil moves in a magnetic field generated by the magnet to drive the vibrating film to vibrate, causing the air to vibrate and emit sound. A third sound guide slot 93 is provided on the middle plate 32. The third sound guide slot 93 is a through hole, the third sound guide slot 93 passes through the middle plate 32 and an upper frame part 311, and the third sound guide slot 93 is curved. The upper frame part 311 recesses toward a direction that faces away from a display screen 20 along a Y-axis direction, so that the upper frame part 311 is spaced apart from the display screen 20, to form a second sound emission slot 132. In other words, the second sound emission slot 132 is located on an exterior surface of a terminal apparatus, and a second sound guide slot 92 extends along an X-axis direction, to form a slender slot. The second sound emission slot 132 is located between two adjacent structural components 10, and the second sound emission slot 132 is in communication with the third sound guide slot 93 to jointly form a third channel C. Sound emitted by the speaker 70 is transmitted to the outside of the terminal apparatus through the third channel C (namely, the curved third sound guide slot 93 and the second sound emission slot 132).

Refer to FIG. 8 again, the middle frame 30 includes a first portion 36 and a second portion 37, and the first portion 36 and the second portion 37 surround and form the third sound guide slot 93. The first portion 36 is connected to the display screen 20 through a colloid 38, and the second portion 37 is spaced apart from the display screen 20 to form the second sound emission slot 132. Because the second sound emission slot 132 is located on an outer surface of the terminal apparatus, the first portion 36 is connected to the display screen 20 through the colloid 38. On the premise that a function of the second sound emission slot 132 is implemented, external impurities (such as dust, water, or the like) may further be reduced or prevented from entering between the display screen 20 and the middle frame 30 and polluting internal components of the terminal apparatus. In other embodiments, a sound emission slot 13 that is in communication with an acoustic element 15 (including but not limited to an earpiece 50 and a microphone 60) may also use the foregoing structure. In other words, the sound emission slot 13 is provided on the middle frame 30. On the premise that a function of the sound emission slot 13 may be implemented, a slot between the middle frame 30 and the display screen 20 may be sealed by a colloid 38. In other embodiments, the third sound guide slot 93 may also face a side on which the housing 40 is located. In other words, the first portion 36 is connected to the housing 40, and the second portion 37 is separated from the middle frame 30 to form the second sound emission slot 132.

It may be understood that in some embodiments, alternatively, the second sound emission slot 132 may be formed by the display screen 20 that recesses along the direction that faces away from the upper frame part 311 along the Y-axis direction, so that the upper frame part 311 is spaced apart from the display screen 20. In some implementations, alternatively, the second sound emission slot 132 may further be formed by the upper frame part 311 being recessed in the direction that faces away from the display screen 20 along the Y-axis direction, and the display screen 20 recesses toward the direction that faces away from the upper frame part 311 along the Y-axis direction, so that the upper frame part 311 is spaced apart from the display screen 20.

Figure 9:
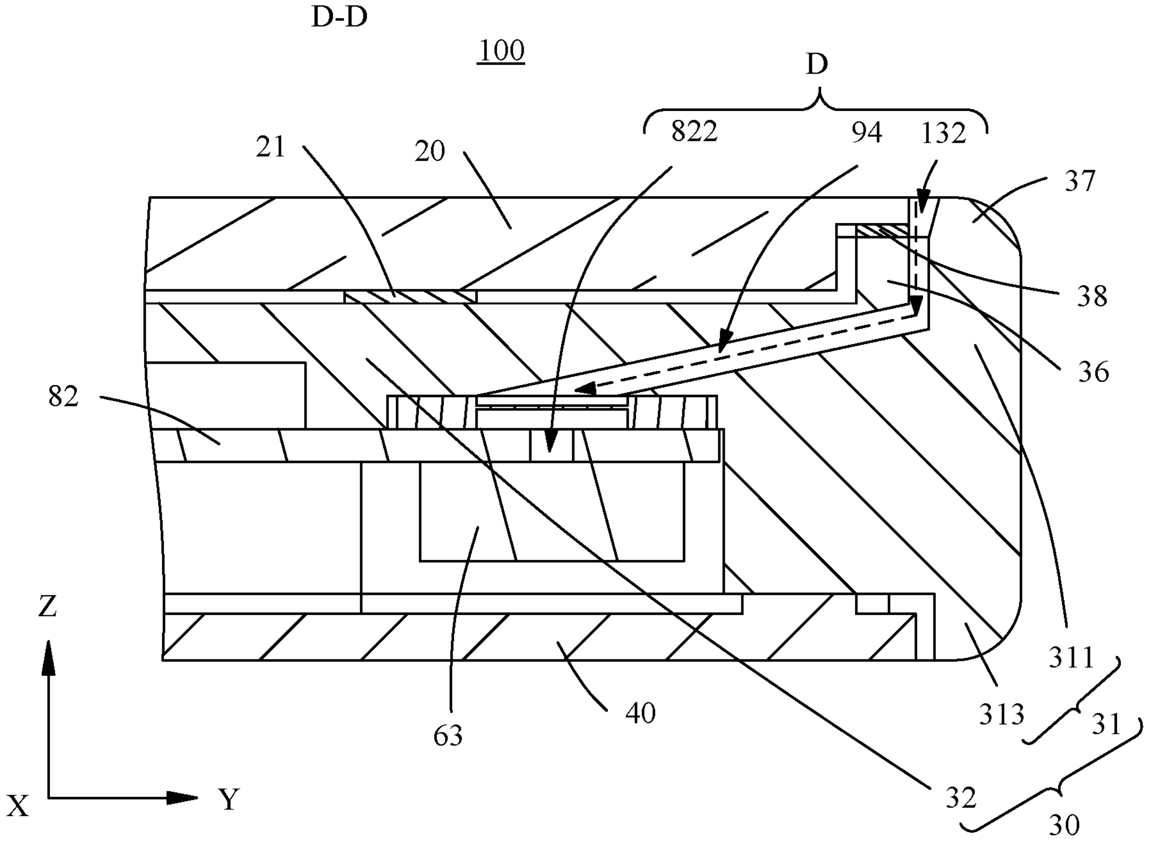
FIG. 9 is a schematic cross-sectional view of the terminal apparatus shown in FIG. 2 along a direction D-D.

FIG. 9 is a cross-sectional view along a direction D-D in FIG. 2. A second circuit board 82 is located on a side of a speaker 70, and a second microphone 63 is fixed on an area of the second circuit board 82 that is adjacent to the speaker 70. A structural relationship between the second microphone 63 and the second circuit board 82 is roughly the same as a structural relationship between a first microphone 61 and a first circuit board 81. A second microphone hole 822 is provided on the second circuit board 82, and the second microphone 63 covers the second microphone hole 822, to be specific, at least a part of the second microphone 63 is exposed to the second microphone hole 822 along a Z-axis direction.

Along the Z-axis direction, a fourth sound guide slot 94 is provided on a middle plate 32 in an area roughly corresponding to the second microphone 63. A first portion 36 and a second portion 37 surround and form the fourth sound guide slot 94, and the fourth sound guide slot 94 is in communication with the second microphone hole 822. A first portion 36 is connected to the display screen 20 through a colloid 38, and a second sound emission slot 132 formed by the second portion 37 and a display screen 20 that are spaced apart is in communication with the fourth sound guide slot 94. The second microphone hole 822, the fourth sound guide slot 94, and the second sound emission slot 132 are in communication with each other to form a fourth channel D. Sound in the outside may pass through the fourth channel D (namely, the second sound emission slot 132, the fourth sound guide slot 94, and the second microphone hole 822), to transmit the sound in the outside to the second microphone 63 to implement sound pickup. An arrangement manner of a fourth sound guide slot 94 may be the same as an arrangement manner of the second sound guide slot 92. To be specific, the fourth sound guide slot 94 may be formed by the middle plate 32 and/or the display screen 20 that recesses.

Refer to FIG. 2, FIG. 8, and FIG. 9, in the XY plane, the second sound emission slot 132 is in communication with the third sound guide slot 93 and the fourth sound guide slot 94. In other words, the third channel C and the fourth channel D share the second sound emission slot 132.

In some embodiments, the middle frame 30 may further include a blocking part (not shown in the figure). The blocking part is arranged on a side on which a first groove 33 is located. The blocking part is arranged in an area in which the middle plate 32 and an upper frame part 311 are connected to each other, and is located between the third sound guide slot 93 and the fourth sound guide slot 94. The blocking part is configured to separate the third sound guide slot 93 and the fourth sound guide slot 94, to reduce mutual interference of the sound passing through the third channel C and the fourth channel D.

In some embodiments, the sound emission slot 13 is not limited to be arranged in a straight side area of an edge of a terminal apparatus, and may further be arranged in a corner area of the terminal apparatus.

In some embodiments, a sound emission slot 13 is not limited to be provided on a side on which the display screen 20 is located, but also may be provided on a side on which the housing 40 is located, or the sound emission slot 13 may be provided on both a side on which the display screen 20 is located and a side on which the housing 40 is located.

Figure 10:
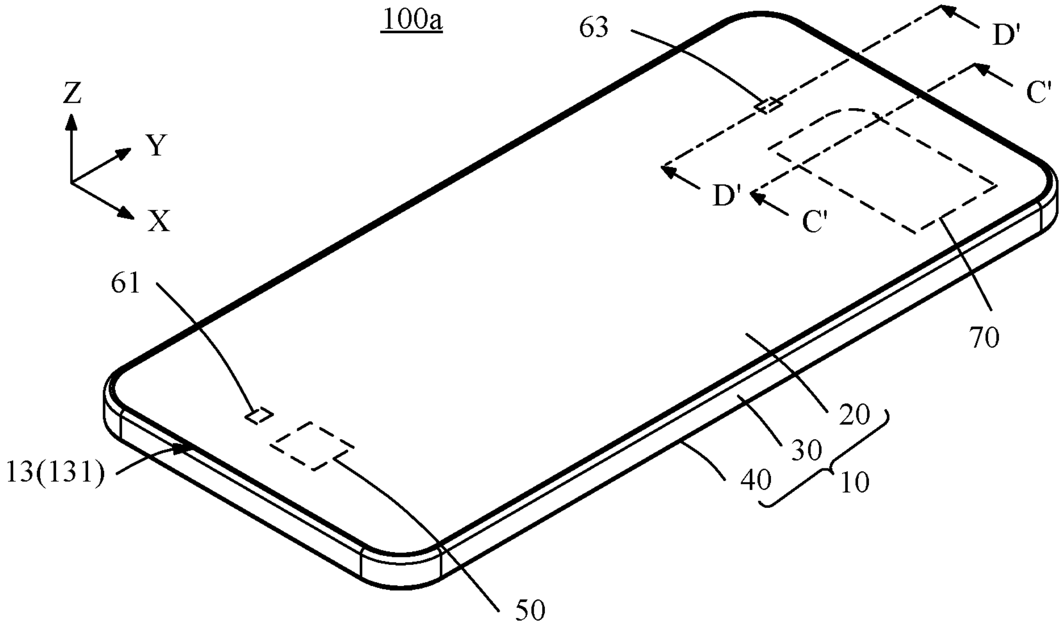
FIG. 10 is a schematic diagram of a structure of a terminal apparatus according to some other embodiments of this application.

Referring to FIG. 10, some other embodiments of this application provide a mobile phone 100*a*, and sound emission slots 13 are provided on a side on which a display screen 20 is located and a side on which a housing 40 is located. The sound emission slot 13 that is in communication with an earpiece 50 and a first microphone 61 is provided on the side on which the display screen 20 is located, and the sound emission slot 13 that is in communication with a second microphone 63 and a speaker 70 is provided on the side on which the housing 40 is located. It may be understood that in other embodiments, both the sound emission slot 13 that is in communication with the earpiece 50 and the first microphone 61 and the sound emission slot 13 that is in communication with the second microphone 63 and the speaker 70 may be provided on the side on which the housing 40 is located.

Figure 11:
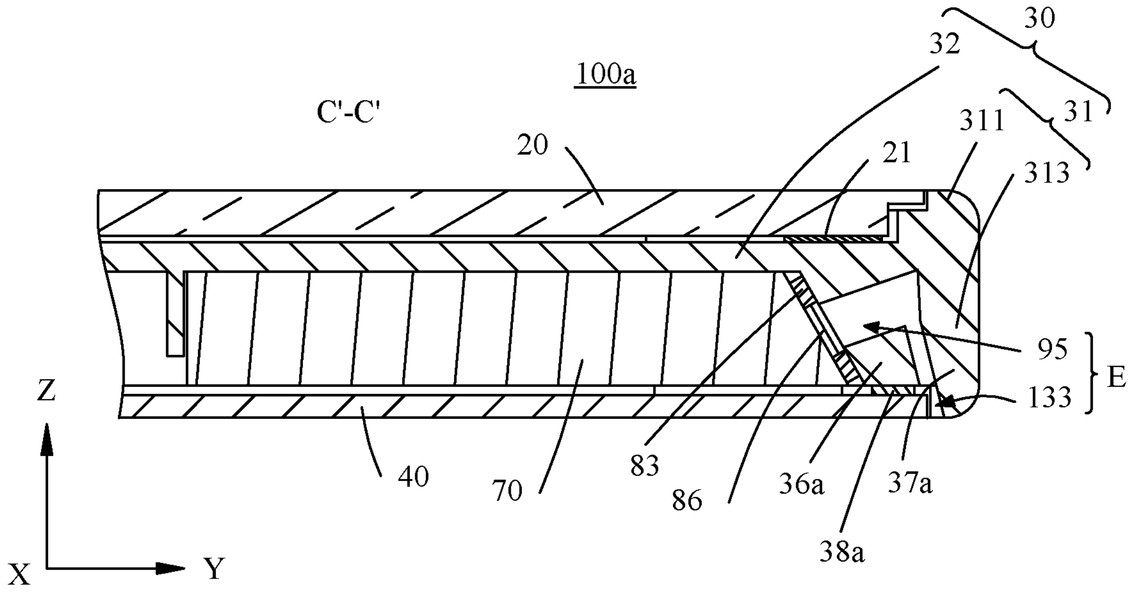
FIG. 11 is a schematic cross-sectional view of the terminal apparatus shown in FIG. 10 along a direction C'-C'.

FIG. 11 is a cross-sectional view along a direction C'-C' in FIG. 10. A fifth sound guide slot 95 is provided on a middle plate 32. The fifth sound guide slot 95 is a through hole, and the fifth sound guide slot 95 passes through the middle plate 32 and a lower frame part 313. A first portion 36*a* and a second portion 37*a* surround and form the fifth sound guide slot 95, the fifth sound guide slot 95 is curved, and an end of the fifth sound guide slot 95 is close to a speaker 70 and is in communication with the speaker 70. The first portion 36*a* is connected to a housing 40 through a colloid 38*a*, and the second portion 37*a* recesses toward a direction that faces away from the housing 40 along a Y-axis direction, so that the second portion 37*a* is spaced apart from the housing 40, to form a third sound emission slot 133. The third sound emission slot 133 is located on an exterior surface of a mobile phone 100*a*, and the third sound emission slot 133 extends along an X-axis direction, to form a slender slot. The third sound emission slot 133 is located between two adjacent structural components 10, and the third sound emission slot 133 is in communication with the fifth sound guide slot 95 to jointly form a fifth channel E. Sound emitted by a speaker 70 is transmitted to the outside of the mobile phone 100*a* through the fifth channel E (namely, the curved fifth sound guide slot 95 and the third sound emission slot 133). It may be understood that the colloid 38*a* is connected to a middle frame 30 and the housing 40. On the premise that a function of the third sound emission slot 133 is implemented, external impurities (such as dust, water, or the like) may be reduced or prevented from entering between the housing 40 and the middle frame 30 and polluting internal components of the mobile phone 100*a*.

Figure 12:
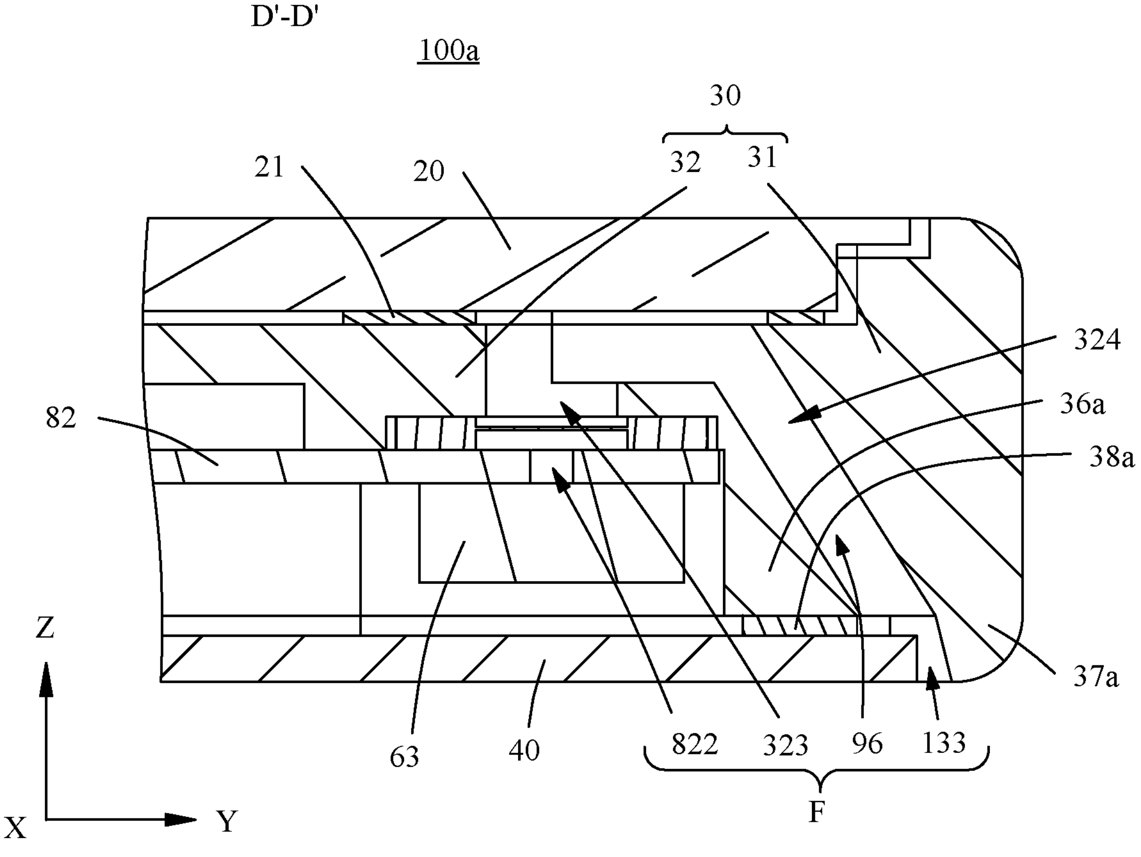
FIG. 12 is a schematic cross-sectional view of the terminal apparatus shown in FIG. 10 along a direction D'-D'.

FIG. 12 is a cross-sectional view along a direction D'-D' in FIG. 10. a third through hole 323 is provided on a middle plate 32 in an area roughly corresponding to a second microphone 63 along a Z-axis direction, and the third through hole 323 is in communication with a second microphone hole 822; and a fourth through hole 324 is provided on a lower frame part 313 and extends to an area in which a housing 40 is located, and the middle plate 32 is spaced apart from a display screen 20 and is in communication with the fourth through hole 324 to jointly form a sixth sound guide slot 96. A first portion 36*a* and a second portion 37*a* surround and form a part of the sixth sound guide slot 96. In other words, in this embodiment, the sixth sound guide slot 96 includes two parts: space between a middle frame 30 and the display screen 20 and the fourth through hole 324 passing through the middle plate 32 and the lower frame part 313. A third sound emission slot 133 formed by the second portion 37*a* and the housing 40 that are spaced also extends to an area in which the second microphone 63 is located, so that the third sound emission slot 133 is in communication with the sixth sound guide slot 96. The second microphone hole 822, the third through hole 323, the sixth sound guide slot 96, and the third sound emission slot 133 are in communication with each other to form a sixth channel F. Sound in the outside may pass through through the sixth channel F (namely, the third sound emission slot 133, the sixth sound guide slot 96, the third through hole 323, and the second microphone hole 822), so that the sound in the outside is transmitted to the second microphone 63 to implement sound pickup.

Figure 13:
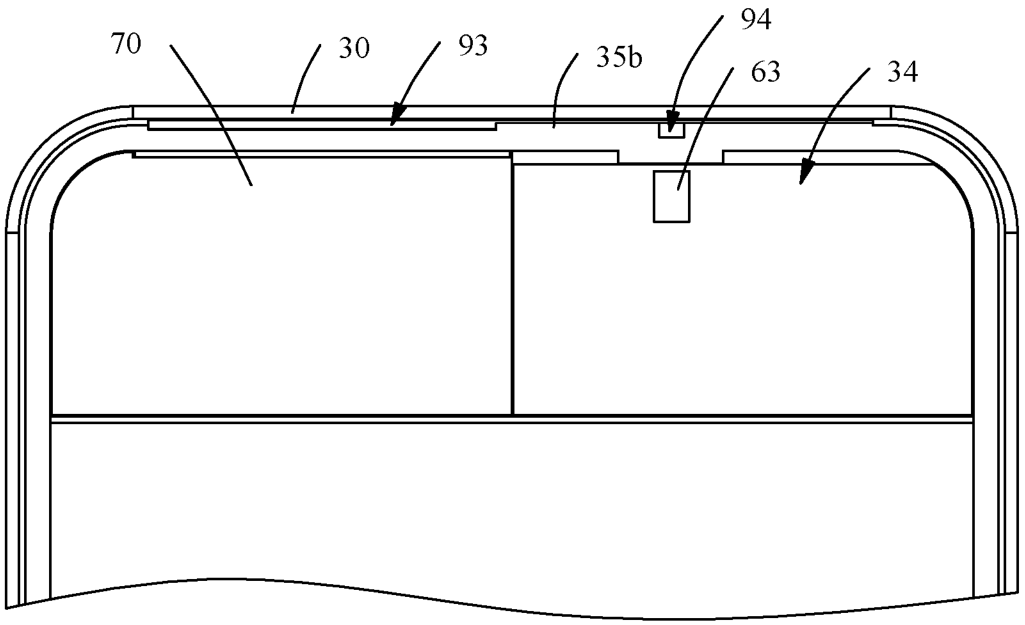
FIG. 13 is a schematic diagram of a partial structure of the middle frame including the blocking part shown in FIG. 10.

Referring to FIG. 13, in some embodiments, the middle frame 30 may further include a blocking part 35*b*. The blocking part 35*b* is arranged on a side on which a second groove 34 is located. The blocking part 35*b* is arranged in an area in which a middle plate 32 and a lower frame part 313 are connected to each other, and is located between a fifth sound guide slot 95 and a sixth sound guide slot 96. The blocking part 35*b* is configured to separate the fifth sound guide slot 95 and the sixth sound guide slot 96, to reduce mutual interference of sound passing through a fifth channel E and a sixth channel F.

Figure 14:
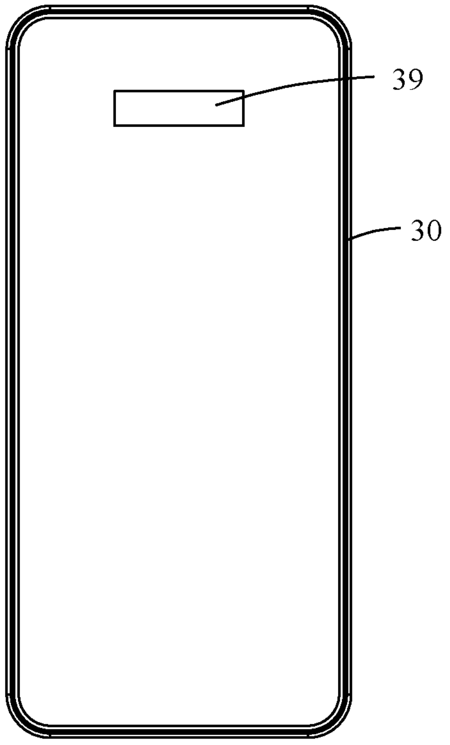
FIG. 14 is a schematic diagram of a structure of a middle frame according to some embodiments of this application.
Figure 15:
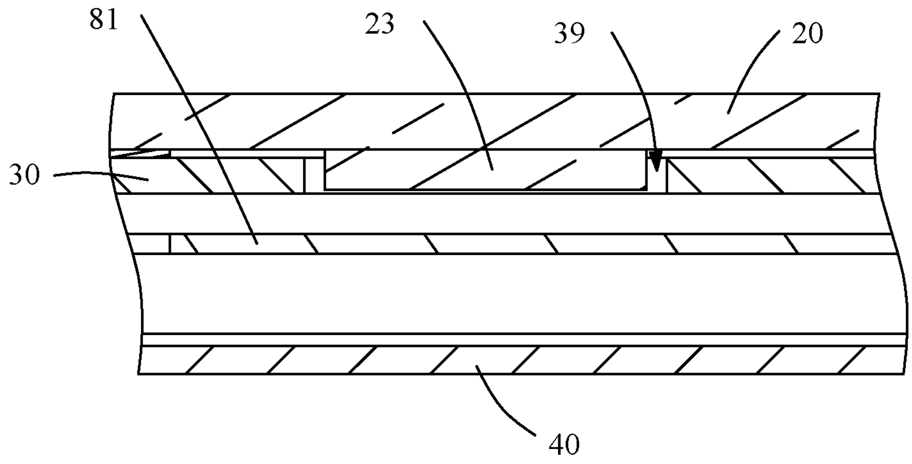
FIG. 15 is a schematic cross-sectional view of a terminal apparatus including an exciter.

When a sound emission slot 13 (such as a third sound emission slot 133) is located on a side of a housing 40, because in a process in which a user uses a mobile phone 100*a*, usually a display screen 20 faces the user, when the sound emission slot 13 is located on a side of the housing 40 of the mobile phone 100*a*, it is more difficult for the user to find the sound emission slot 13 on a back side (namely, a side on which the housing 40 is located). This further enhances refinement and appearance competitiveness of the mobile phone 100*a*. A screen may be used to emit sound (to be specific, the display screen emits sound) in a terminal apparatus. For example, referring to FIG. 14 and FIG. 15, a mobile phone 100*a* may further include an exciter 23. The exciter 23 is fixed on a display screen 20 and is located in a cavity 11. The exciter 23 is spaced apart from a middle frame 30 and a circuit board 80 (such as a first circuit board 81). An avoidance groove 39 configured to accommodate the exciter 23 may be provided on the middle frame 30 so that the exciter 23 is spaced apart from the middle frame 30. The exciter 23 may be piezoelectric ceramics, a moving coil magnet, or the like. In some embodiments, for example, when a sound emission slot 13 is provided on a side on which a housing 40 is located, because when a user uses the mobile phone 100*a*, such as making a phone call, watching a video, or the like. Usually, a side on which a screen is located faces a user, the sound emission slot 13 is designed on the side on which the housing 40 is located, and sound is transmitted from the side on which the housing 40 is located, which is difficult to ensure a use effect. When combined with screen sound, refinement and appearance competitiveness of the mobile phone 100*a* may be improved without affecting the use effect of the user.

It may be understood that channels of an earpiece 50 and a first microphone 61 configured to transmit sound is not limited to be provided on a side on which the display screen 20 is located, and may also be provided on the side on which the housing 40 is located. In other words, a fourth sound emission slot (not shown in the figure) is provided on the side on which the housing 40 is located. A specific arrangement structure may be a structural design of a first channel A and a second channel B, which is not repeated herein.

Figure 16:
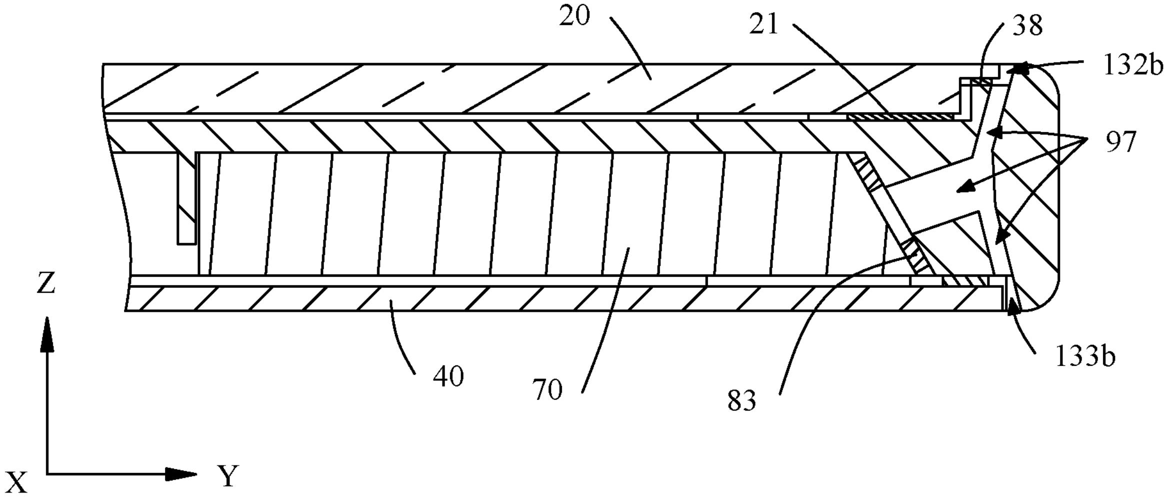
FIG. 16 is a schematic cross-sectional view of a terminal apparatus in which two sound emission slots share one sound guide slot according to some embodiments of this application.

In some embodiments, a channel that is in communication with a same acoustic element 15 is not limited to one, and may also be more than one. The channel of the same acoustic element 15 configured to transmit sound is not limited to be provided on the side on which the display screen 20 is located, or the side on which the housing 40 is located. The sound emission slots 13 may be provided on both the side on which the display screen 20 is located and the side on which the housing 40 is located. Specifically, referring to FIG. 16, some embodiments of this application provide a schematic cross-sectional view of a mobile phone 100*b*. In this embodiment, the mobile phone 100*b* simultaneously includes a second sound emission slot 132*b* and a third sound emission slot 133*b*, and a seventh sound guide slot 97 with a bifurcation structure may be provided on a middle frame 30. A starting point of the seventh sound guide slot 97 faces a vibrating film of a speaker 70. One end of the seventh sound guide slot 97 faces a display screen 20, and the other end faces a housing 40. The seventh sound guide slot 97 with the bifurcation structure is not limited to be in communication with the speaker 70, and may also be another acoustic element 15. In other words, a plurality of sound emission slots may share a same sound guide slot, and a same acoustic element 15 may implement sound emission or sound pickup from the plurality of sound emission slots. This improves a sound emission or sound pickup effect of the acoustic element 15.

It may be understood that channels of an earpiece 50 and a first microphone 61 configured to transmit sound is not limited to be provided on a side on which a display screen 20 is located, or on a side on which the housing 40 is located, or a sound emission slot 13 may be provided on both a side on which the display screen 20 is located and a side on which the housing 40 is located. In other words, a terminal apparatus may simultaneously include a first sound emission slot 131 and a fourth sound emission slot.

In some embodiments, a display screen 20 of the mobile phone 100 may be a flat display screen. For example, the display screen 20 is located in an XY plane. In other embodiments, the display screen 20 may also be a curved display screen (including but not limited to a two-curved screen, a four-curved screen, or the like).

Figure 17:
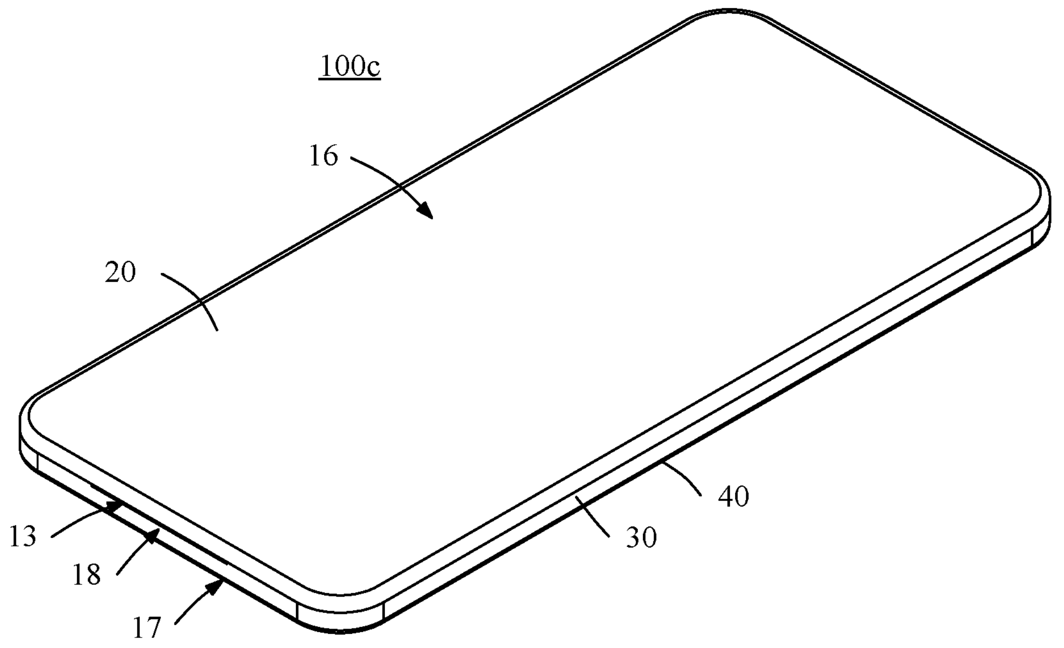
FIG. 17 is a schematic diagram of an overall structure of a terminal apparatus including a curved display screen according to some embodiments of this application.
Figure 18:
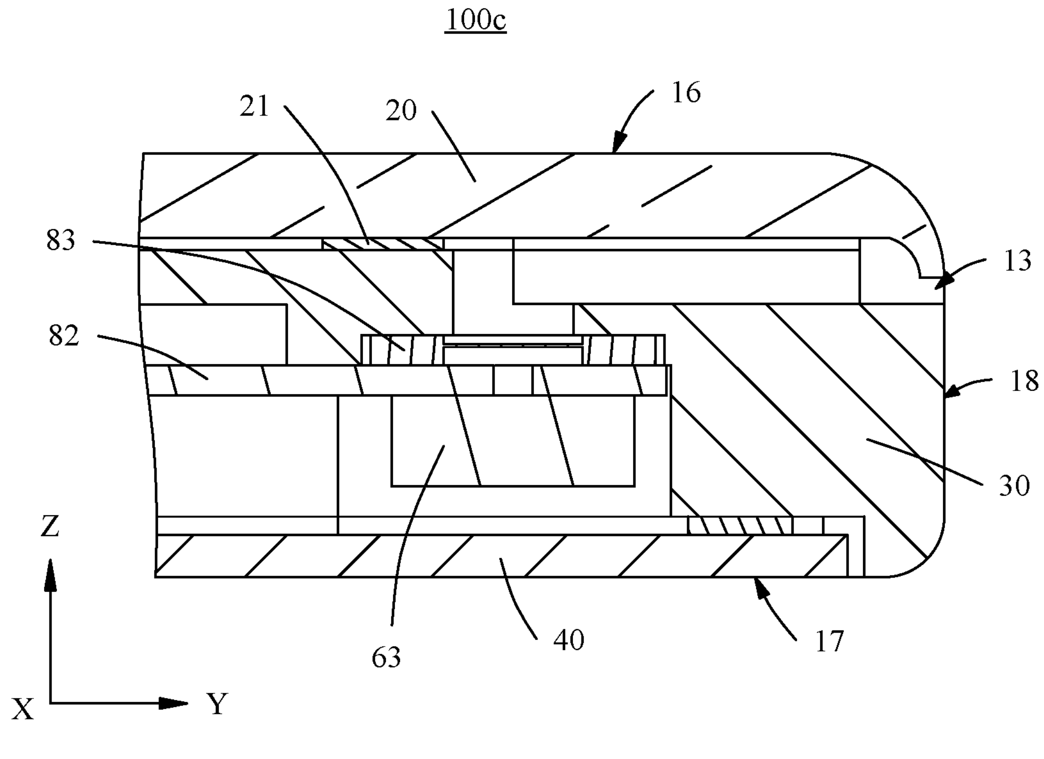
FIG. 18 is a schematic cross-sectional view of the terminal apparatus shown in FIG. 17.

Refer to FIG. 17 and FIG. 18. FIG. 17 is a schematic diagram of an overall structure of a mobile phone 100*c* whose display screen 20 is a curved display screen according to some embodiments of this application. FIG. 18 is a schematic cross-sectional view of the mobile phone 100*c* shown in FIG. 17. The mobile phone 100*c* includes a first surface 16, a second surface 17, and a side surface 18. The side surface 18 is connected to the first surface 16 and the second surface 17. The first surface 16, the second surface 17, and the side surface 18 surround and form an outer surface of the mobile phone 100*c*. The first surface 16 is a side on which the display screen 20 is located, and the second surface 17 is a side on which a housing 40 is located.

Because the display screen 20 is a curved surface, the display screen 20 is further curved to the side surface 18. In other words, a surface of the display screen 20 includes the first surface 16 and a part of the side surface 18, and the rest of the side surface 18 may be a surface of a middle frame 30. A sound emission slot 13 may be provided between the display screen 20 and the middle frame 30. In other words, the sound emission slot 13 is located on a side surface 18 of the mobile phone 100*c*. Because in a process in which a user uses the mobile phone 100*c*, the display screen 20 usually faces the user, and when the sound emission slot 13 is located on the side surface 18 of the mobile phone 100*c*, it is more difficult for the user to find the sound emission slot 13 located on the side surface 18. This further improves refinement and appearance competitiveness of the mobile phone 100*c*.

Figure 19:
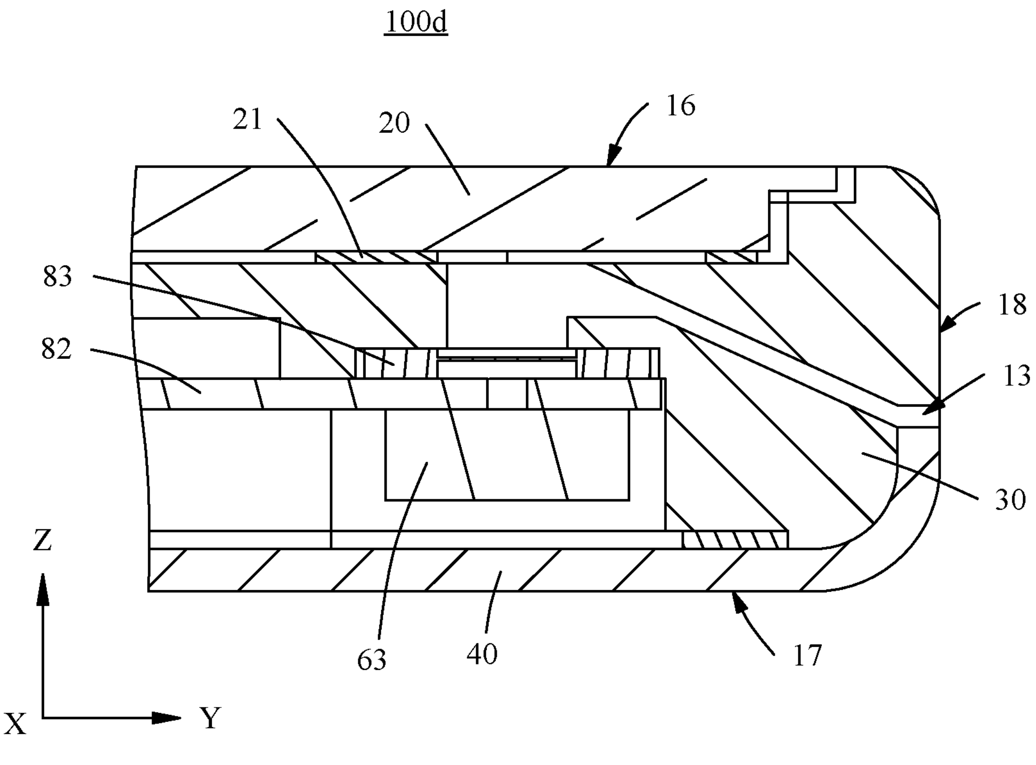
FIG. 19 is a schematic cross-sectional view of a terminal apparatus including a curved housing according to some embodiments of this application.

Referring to FIG. 19, in some embodiments, when a sound emission slot 13 is provided on a side surface 18 of a mobile phone 100*d*, the sound emission slot 13 may also be located between a middle frame 30 and a housing 40. In other words, the housing 40 is a curved surface, and the housing 40 is curved to the side surface 18. When the housing 40 is curved to the side surface 18 and a sound emission slot 13 is located between the middle frame 30 and the housing 40, a display screen 20 may be a flat display screen or a curved display screen.

Figure 20:
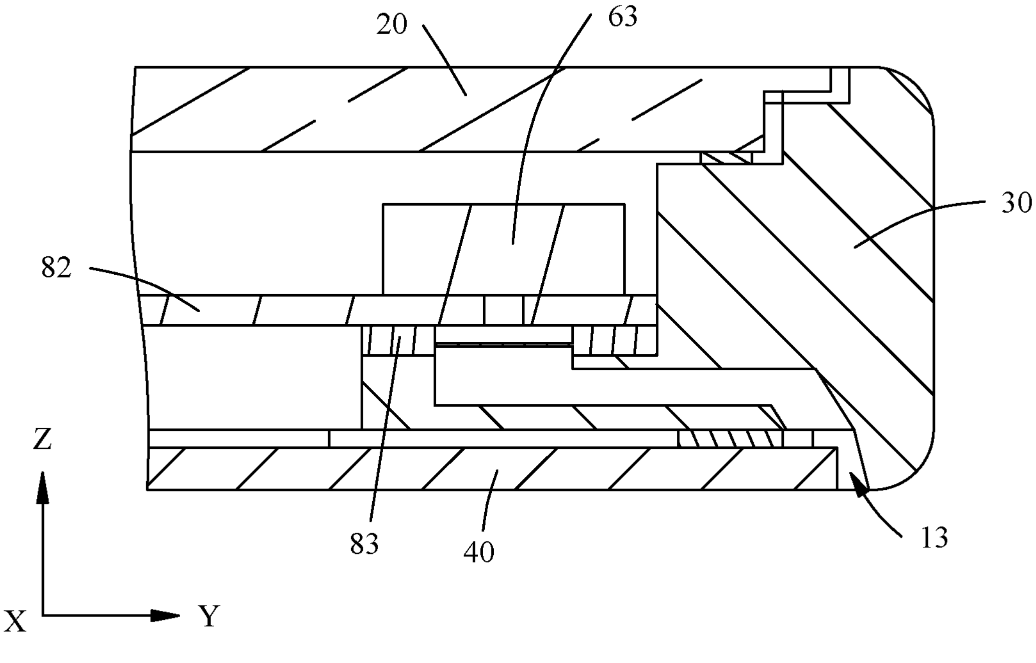
FIG. 20 is a schematic cross-sectional view of a terminal apparatus according to some embodiments of this application.

In some embodiments, relative positions of acoustic elements 15 such as a microphone 60, an earpiece 50, and a speaker 70, and relative positions of the display screen 20, the middle frame 30, and the housing 40 are not limited to the foregoing structures, and may be adjusted as required. Refer to FIG. 20. In this embodiment, an earpiece 50 is located between a middle plate 32 and a display screen 20 and is fixed on a second circuit board 82. A sound guide slot is configured to be in communication with the earpiece 50 and a sound emission slot 13 is located between a housing 40 and a middle frame 30.

A quantity of speakers 70 is not limited to one, and may further be more than one (to be specific, greater than or equal to two), to provide a more realistic stereo effect. A quantity of sound emission slots 13 configured to be in communication with a speaker 70 may be the same as or different from the quantity of speakers 70. A position of the sound emission slot 13 may be arranged according to a desired stereo effect.

Figure 21:
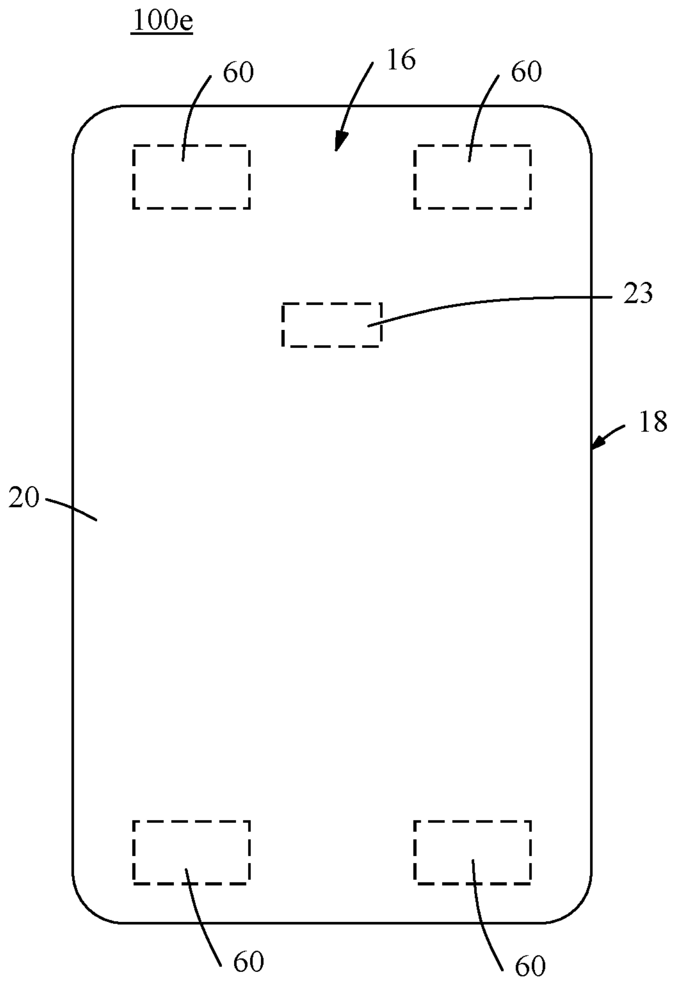
FIG. 21 is a schematic diagram of a terminal apparatus according to some embodiments of this application.
Figure 22:
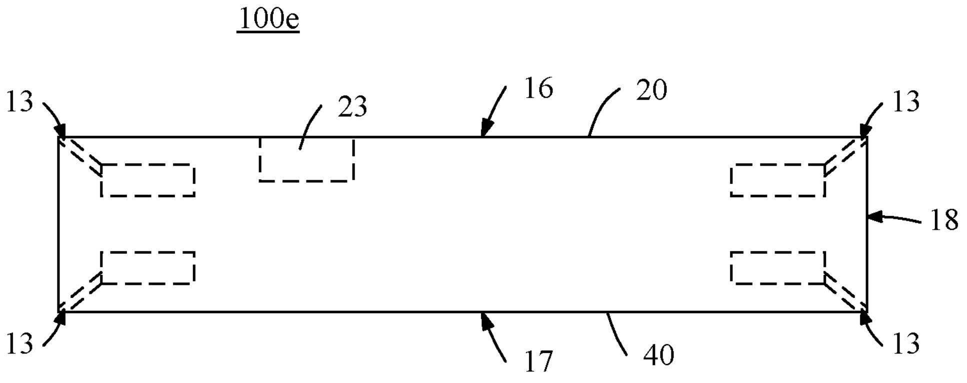
FIG. 22 is a schematic diagram of a terminal apparatus according to some embodiments of this application.

In a specific embodiment, refer to FIG. 21 and FIG. 22. Using a mobile phone 100*e* with four speakers 70 as an example, a quantity of sound emission slots 13 configured to be in communication with the speakers 70 is four. Two of the speakers 70 are located at one end of a mobile phone 100, and the other two speakers 70 are located at the other end of the mobile phone 100*e*; and two of the sound emission slots 13 are located on a side on which a display screen 20 is located, and the other two sound emission slots 13 are located on a side on which a housing 40 is located. The four speakers 70 implement sound transmission through different sound emission slots 13, and therefore a stereo effect of the mobile phone 100 is even better. In some embodiments, sound on display may further be designed as required.

Figure 23:
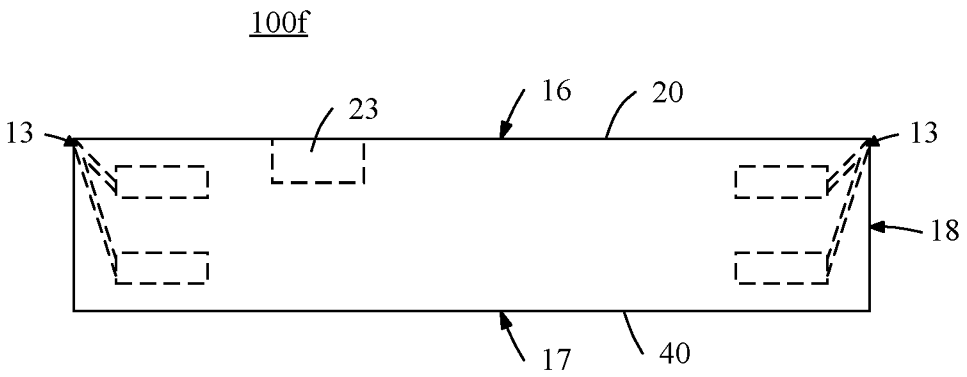
FIG. 23 is a schematic diagram of a terminal apparatus according to some embodiments of this application.

In a specific embodiment, refer to FIG. 23. Using a mobile phone 100*f* with four speakers 70 as an example, a quantity of sound emission slots 13 that are in communication with the speakers 70 is two. Two of the speakers 70 are located at one end of the mobile phone 100*f*, and the other two speakers 70 are located at the other end of the mobile phone 100*f*; and sound emission slots 13 are all located on a side of a display screen 20, and every two speakers 70 share one sound emission slot 13. In some embodiments, sound on display may further be designed as required.

Figure 24:
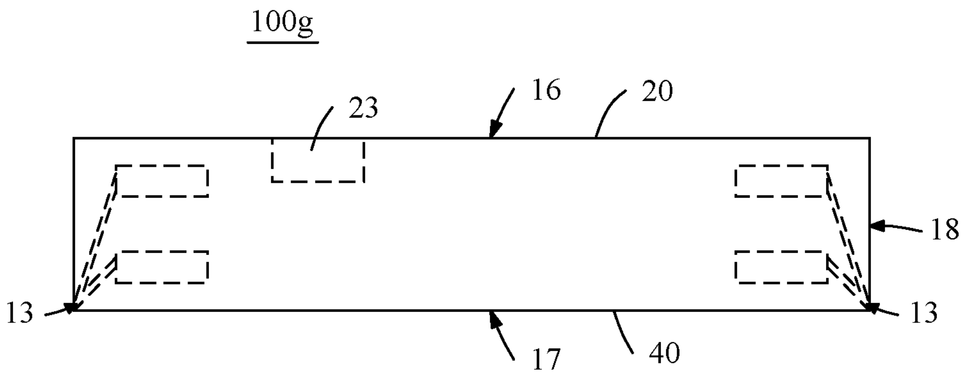
FIG. 24 is a schematic diagram of a terminal apparatus according to some embodiments of this application.

In a specific embodiment, refer to FIG. 24. Using a mobile phone 100*g* with four speakers 70 as an example, a quantity of sound emission slots 13 configured to be in communication with the speakers 70 is two. Two of the speakers 70 are located at one end of the mobile phone 100*g*, and the other two speakers 70 are located at the other end of the mobile phone 100*g*; and sound emission slots 13 are all located on a side of a housing 40, and every two speakers 70 share one sound emission slot 13. In some embodiments, sound on display may further be designed as required.

Figure 25:
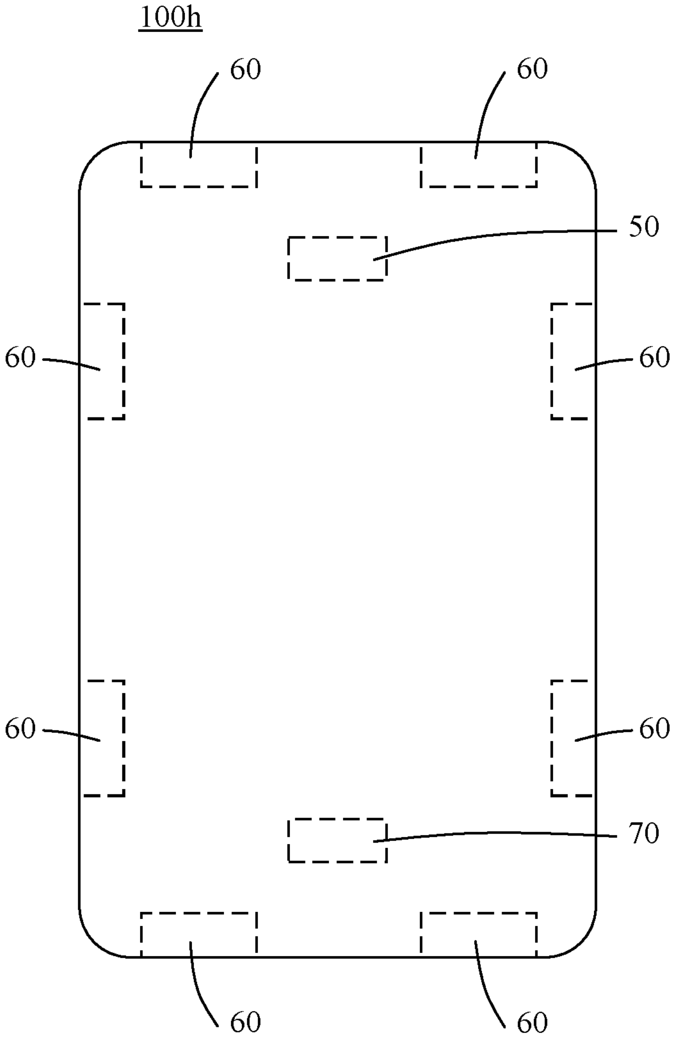
FIG. 25 is a schematic diagram of a terminal apparatus according to some embodiments of this application.

In some embodiments, referring to FIG. 25, a quantity of microphones 60 is not limited to two, but may further be more than one. Positions of the microphones 60 may be set as required, for example, around a mobile phone 100*h*.

In the terminal apparatus provided in the embodiments of this application (such as a mobile phone 100, 100*a*, 100*b*, 100*c*, 100*d*, 100*e*, 100*f*, 100*g*, and 100*h*), a sound emission slot 13 is provided between two adjacent structural components 10 without providing a hole on the structural components 10, and this effectively ensures integrity of the structural components 10, and improves refinement and appearance competitiveness of the terminal apparatus; and in addition, a minimum width of the sound emission slot 13 is less than a diameter of the hole in the related art, to effectively reduce or prevent impurities such as dust or water from entering the inside of the terminal apparatus; and a manufacturing process of forming the sound emission slot 13 between the two structural components 10 is simpler than a process of forming a hole, and a stress of the structural component 10 that needs to be overcome is small, and it is convenient to perform surface processing on the slot to form a smooth surface, which is more convenient for forming structural components 10.

The foregoing implementations are only intended for describing the technical solutions of this application but not for limiting this application. Although this application is described in detail with reference to the preferred implementations, a person of ordinary skill in the art should understand that modifications or equivalent replacements can be made to the technical solutions of this application without departing from the spirit and scope of the technical solutions of this application.

What is claimed is:

1. A terminal apparatus, comprising:

a first structural component;

a second structural component;

a third structural component, wherein the second structural component is located between the first structural component and the third structural component, and the first structural component, the second structural component, and the third structural component jointly surround and define a cavity;

a first acoustic element and a second acoustic element that are accommodated in the cavity;

a first sound emission slot and a second sound emission slot between the first structural component and the second structural component and/or between the second structural component and the third structural component, the second structural component comprises a first portion, a second portion, a first sound guide slot, and a second sound guide slot, the first portion and the second portion surround and define the first sound guide slot and the second sound guide slot, the first portion is connected to the first structural component, and the second portion is spaced apart from the first structural component to define the first sound emission slot and the second sound emission slot, the first sound guide slot is in communication with the first sound emission slot, the second sound guide slot is in communication with the second sound emission slot, the first sound emission slot is located on a side of the first sound guide slot that faces away from the first acoustic element, the second sound emission slot is located on a side of the second sound guide slot that faces away from the second acoustic element, the first acoustic element transmits sound to the outside through the first sound guide slot and the first sound emission slot, and the second acoustic element receives sound from the outside through the second sound guide slot and the second sound emission slot; and a blocking part between the first sound guide slot and the second sound guide slot, wherein the blocking part is configured to reduce interference of sound passing through the first sound guide slot and the second sound guide slot.

2. The terminal apparatus according to claim 1, wherein the terminal apparatus further comprises a colloid, and the colloid is configured to connect the first portion and the first structural component.

3. The terminal apparatus according to claim 1, wherein at least one the first sound emission slot and the second sound emission slot are each located between the first structural component and the second structural component.

4. The terminal apparatus according to claim 1, wherein the first structural component is a display screen, the second structural component is a middle frame, and the third structural component is a housing.

5. The terminal apparatus according to claim 4, wherein the first sound emission slot is between the housing and the middle frame.

6. A terminal apparatus, comprising:

a display screen;

a middle frame;

a housing;

a circuit board;

an earpiece; and a microphone, wherein the display screen is connected to the middle frame, the middle frame includes a frame and a middle plate, the frame is in an annular shape and surrounds the middle plate, the frame includes a first frame part and a second frame part, a first groove is defined by the first frame part and the middle plate, a second groove is defined by the second frame part and the middle plate, the display screen is disposed in the first groove, a sound emission slot is provided on a space which is defined by the first frame part and the display screen, a first through hole and a second through hole are provided on the middle frame;

a first sound guide slot and a second sound guide slot are provided on a space, and the space is defined by the middle plate and the display screen, a first channel comprises the first sound guide slot, the first through hole and the sound emission slot, and a second channel comprises the second sound guide slot, the second through hole and the sound emission slot;

the earpiece is connected to the middle frame, sound emitted by the earpiece is transmitted to outside of the terminal apparatus through the first channel;

the microphone is connected to the circuit board, and the circuit board is connected to the middle frame;

the housing is connected to the middle frame, the earpiece and the microphone are disposed in the second groove, and the sound from the outside of the terminal apparatus is transmitted to the microphone through the second channel; and a blocking part is disposed in a side of the first groove, the first sound guide slot and the second sound guide slot are located on an area in which the middle plate and the first frame part are connected to each other, the blocking part is located between the first sound guide slot and the second sound guide slot; wherein the blocking part is configured to separate the first sound guide slot and the second sound guide slot, and to block part of the sound emitted by the earpiece passing from the first channel to the second channel.

7. The terminal apparatus according to claim 6, wherein the terminal apparatus further comprises a sealing ring, wherein the sealing ring is located between the earpiece and the middle plate, and the sealing ring is arranged on a surface of the earpiece that faces the middle plate in an annular shape.

8. The terminal apparatus according to claim 6, wherein the second sound guide slot is in communication with the sound emission slot, and the sound emission slot is located on a side of the second sound guide slot that faces away from the microphone.

9. The terminal apparatus according to claim 6, wherein the first sound guide slot is in communication with the sound emission slot, and the sound emission slot is located on a side of the first sound guide slot that faces away from the earpiece.

10. The terminal apparatus according to claim 6, wherein the frame protrudes on two sides of the middle plate along a thickness direction of the terminal apparatus, and the first frame part and the second frame part are respectively located on opposite sides of the middle plate and are connected to the middle plate.

11. The terminal apparatus according to claim 6, wherein the earpiece covers the first through hole.

12. The terminal apparatus according to claim 6, wherein the circuit board further comprises a microphone hole, and the microphone hole is in communication with the second through hole, the microphone covers the microphone hole.

13. The terminal apparatus according to claim 12, wherein the sound emitted by the earpiece is transmitted to the outside of the terminal apparatus through a sealing ring, the first through hole, the second sound guide slot and the sound emission slot.

14. The terminal apparatus according to claim 12, wherein the sound in the outside of the terminal apparatus is transmitted to the microphone through the sound emission slot, the first sound guide slot, the second through hole and the microphone hole.

15. The terminal apparatus according to claim 6, wherein the sound emission slot is provided on a space which is defined by the display screen.

16. The terminal apparatus according to claim 6, wherein a width of the sound emission slot is 0.1 mm to 0.5 mm.

17. The terminal apparatus according to claim 6, wherein the terminal apparatus further comprises a back adhesive, and the back adhesive is located in the first groove.

18. The terminal apparatus according to claim 17, wherein the back adhesive is configured to bond the display screen and the middle frame.

19. The terminal apparatus according to claim 6, wherein the frame and the middle plate are integrally formed.

20. The terminal apparatus according to claim 6, wherein the first through hole is provided on a space which is defined by the middle plate and the frame.

* * * * *